United States Patent [19]

King, Sr. et al.

[11] 4,061,286
[45] Dec. 6, 1977

[54] AUTOMATIC CASSETTE LOADER

[75] Inventors: James L. King, Sr., Sudbury; James L. King, Jr., Southboro; William E. Cline, Braintree, all of Mass.

[73] Assignee: King Instrument Corporation, Westboro, Mass.

[21] Appl. No.: 695,449

[22] Filed: June 14, 1976

[51] Int. Cl.² .................................. B65H 19/20
[52] U.S. Cl. ........................ 242/56 R; 156/502; 242/58.4
[58] Field of Search ............ 242/56 R, 58.1, 58.2, 242/58.3, 58.4, 67.3 R, 181, 199, 197, 200; 156/502, 506; 226/95

[56] References Cited

U.S. PATENT DOCUMENTS

| 3,582,009 | 6/1971 | Ceroll | 242/56 R |
| 3,814,343 | 6/1974 | Bennett | 242/56 R |
| 3,848,825 | 11/1974 | Zielke | 242/56 R |
| 3,888,480 | 6/1975 | Bagozzi | 242/56 R |
| 3,940,080 | 2/1976 | Bennett | 242/56 R |

Primary Examiner—Edward J. McCarthy
Attorney, Agent, or Firm—Schiller & Pandiscio

[57] ABSTRACT

A machine is provided for automatically loading empty cassettes, each containing a leader, with magnetic tape. The machine is similar in principle to the machine disclosed in U.S. Published Patent Application No. B535,448 wherein sequentially each leader is cut into two sections, one section is sliced to the leading end of a supply tape, a selected length of the supply tape is wound onto the cassette, the supply tape is severed, the trailing end of the supply tape is spliced to the other leader section, and the trailing end of the severed length of supply tape and the other leader section are wound onto the cassette. This invention provides novel means for assuring that the leader is cut into two sections of substantially equal length.

33 Claims, 17 Drawing Figures

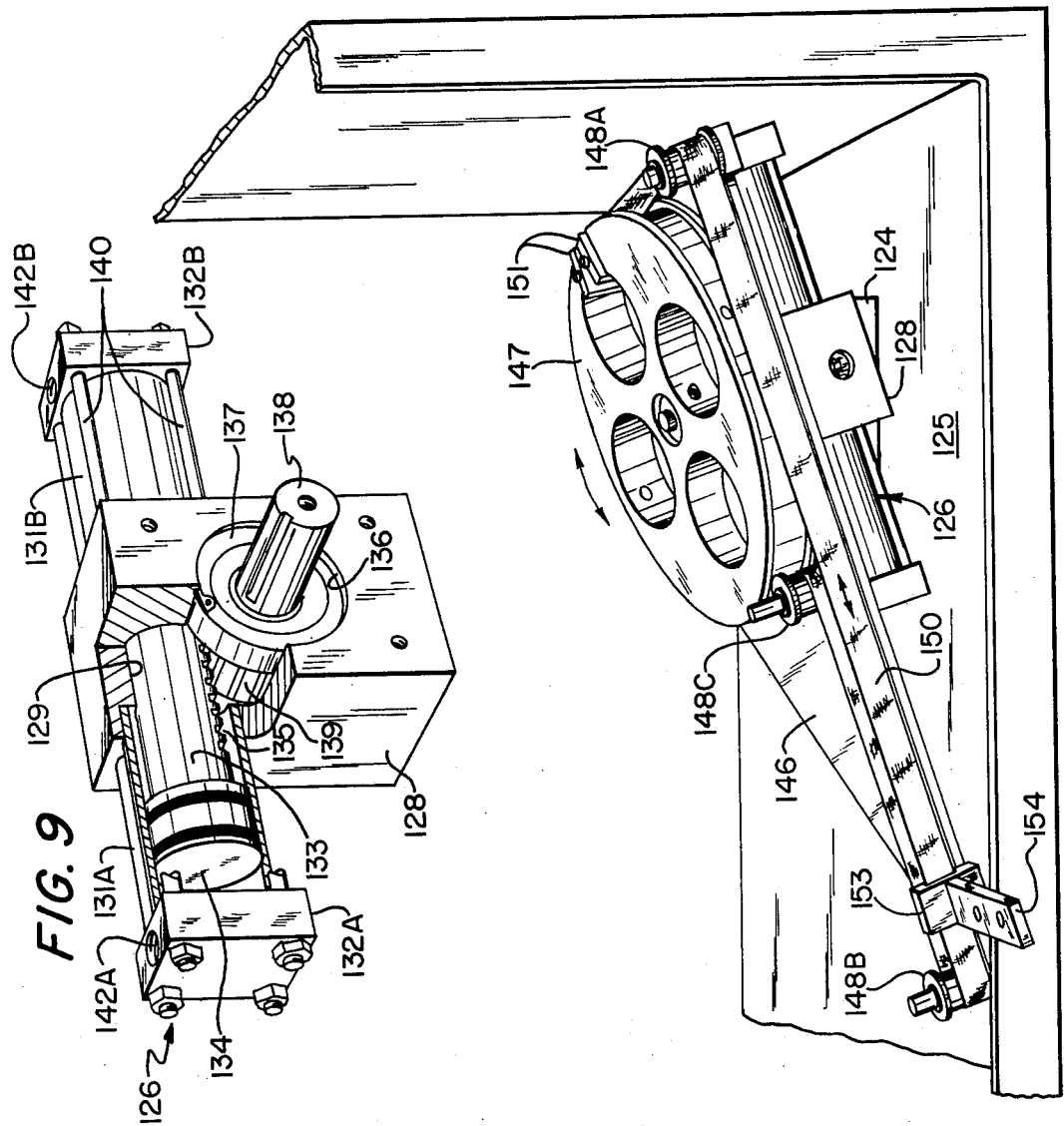

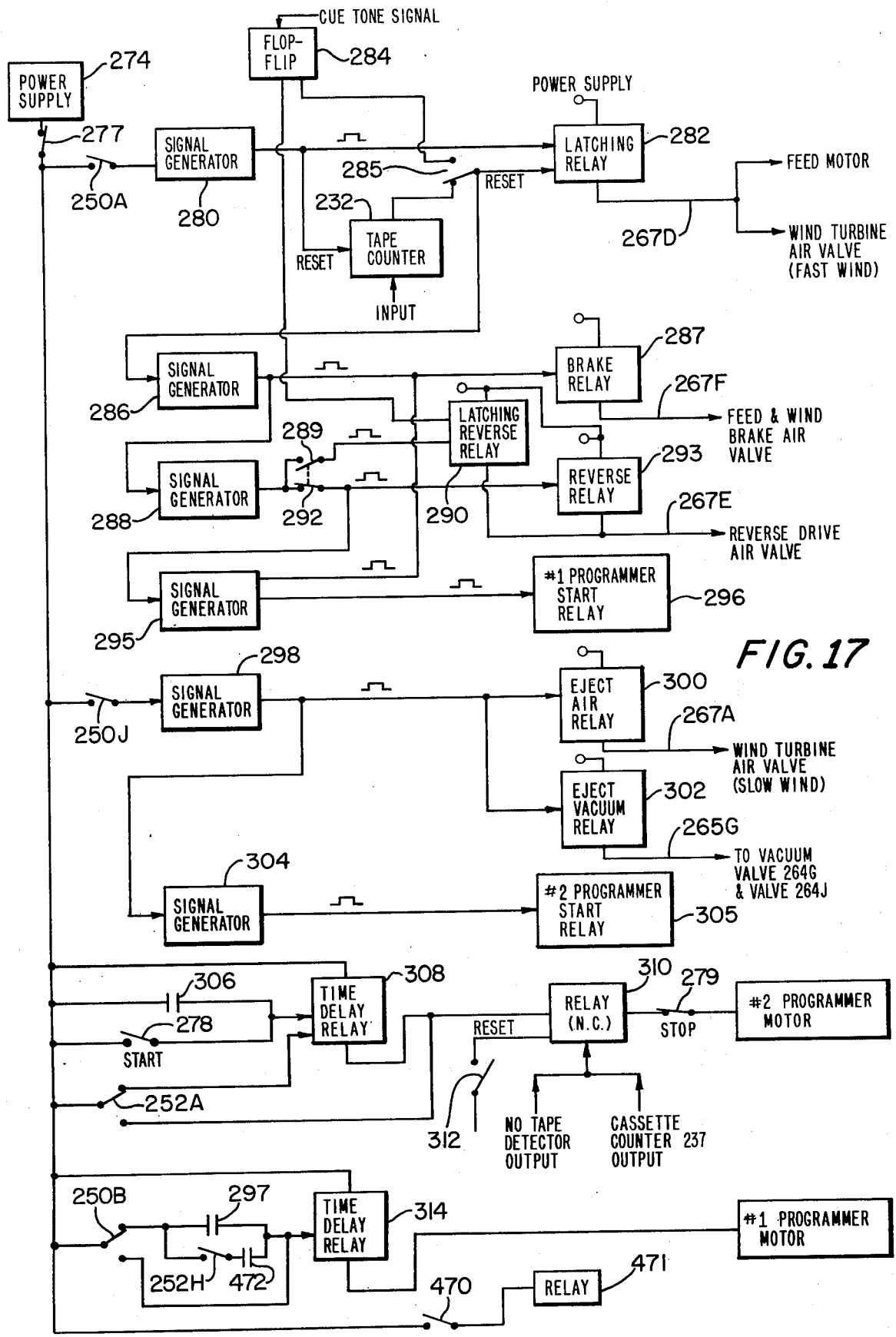

1

AUTOMATIC CASSETTE LOADER

This invention relates to apparatus for splicing and winding tape and more particularly to apparatus for automatically loading tape into cassettes.

U.S. Published Patent Application No. B 535,449 of James L. King, published Mar. 16 1976, now U.S. Pat. No. 3,997,123, discloses an automatic cassette loading machine wherein empty cassettes are delivered one at a time to a selected loading position and are dicharged from that loading position after they have been loaded with magnetic tape. The empty cassettes comprise a pair of spools or hubs and a leader tape which is wound on both of the hubs. In order to effect loading of the cassette, the machine comprises means for withdrawing the leader from the cassette and disposing the leader upon the splicing block assembly which forms part of the same machine. The leader is withdrawn by means of a leader extractor mechanism which is reciprocated between a first position wherein it is disposed adjacent to the splicing block assembly and a second position wherein it is disposed adjacent to a cassette in loading position. The leader extractor mechanism also includes vacuum operated means for sucking the leader out of the cassette and transporting the leader over the splicing block assembly as the extractor mechanism is returned to its first position. During the leader extracting operation, the two hubs of the cassette are free wheeling so that tape can be paid off of both of the hubs. The extracted leader forms a loop extending from the cassette over the splicing block assembly to leader extractor and back again to the cassette. Accordingly, when the leader is cut into two sections as part of the loading operation, one leader section is usually longer than the other leader section. Although in many applications the relative lengths of the two leader sections is immaterial, for certain applications it is necessary for them to have approximately identical lengths. For example, this requirement may be specified by tape recording companies who employ automatic equipment for duplicating recordings on magnetic tape in pre-loaded cassettes. Certain duplicating equipment is designed so that duplication occurs on a tape within a predetermined time after the tape has begun to move out of the cassette toward and through the recording head of the duplicating machine. Hence, if the leader at the beginnning of the tape is of excessive length, the first part of the recording to be duplicated may not be recorded on magnetic tape but instead the recording signal may occur at a time when the leader section is passing the recording head. To avoid this error it is desired that the leader section at one end be within about 1-2 inches of the length of the leader section at the other end of the tape in the cassette (it also appears preferably for most applications for each of the two leader sections to be in the order of 12 to 16 inches long).

Accordingly, the primary object of the present invention is to provide an automatic cassette loader which is arranged to cut the leader of an empty cassette at approximately its midpoint, whereby the two sections of the leader are of substantially equal length.

A more specific object of this invention is to provide a new and improved mechanism for withdrawing the leader from a cassette and disposing it on a splicing block assembly so that the leader can be slit at approximately its midpoint.

Still another specific object of this invention is to improve upon the automatic cassette loading machine disclosed in U.S. Published Patent Application No. B 535,448 by providing means for assuring that the extracted leader of a cassette will be slit at approximately its midpoint.

These objects and other objects which are hereinafter described or rendered obvious are achieved by providing a cassette loading machine of the character described which includes means for causing the leader to be fully withdrawn from the cassette and for causing the leader to be disposed so that the tape cutting mechanism will cut the leader at approximately its midpoint. The machine further includes an improved leader diverter mechanism to facilitate withdrawing the leader from the empty cassette and disposing the leader upon the splicing block assembly.

Other features and many of the attendant advantages of this invention are disclosed in or rendered obvious by the following detailed description which is to be considered together with the accompanying drawings wherein:

FIG. 1 is a front elevation of a cassette loading machine as disclosed in U.S. Published Patent Application No. B 535,448, but modified to include the improvements provided by the present invention;

FIG. 8 is a front perspective view of the drive for the extractor mechanism;

FIG. 9 is a perspective view, partly in section, of a portion of the drive for the extractor mechanism;

FIGS. 15–17 are schematic diagrams of the control system for the machine.

In the drawings, like numerals refer to like parts.

Figure 1:
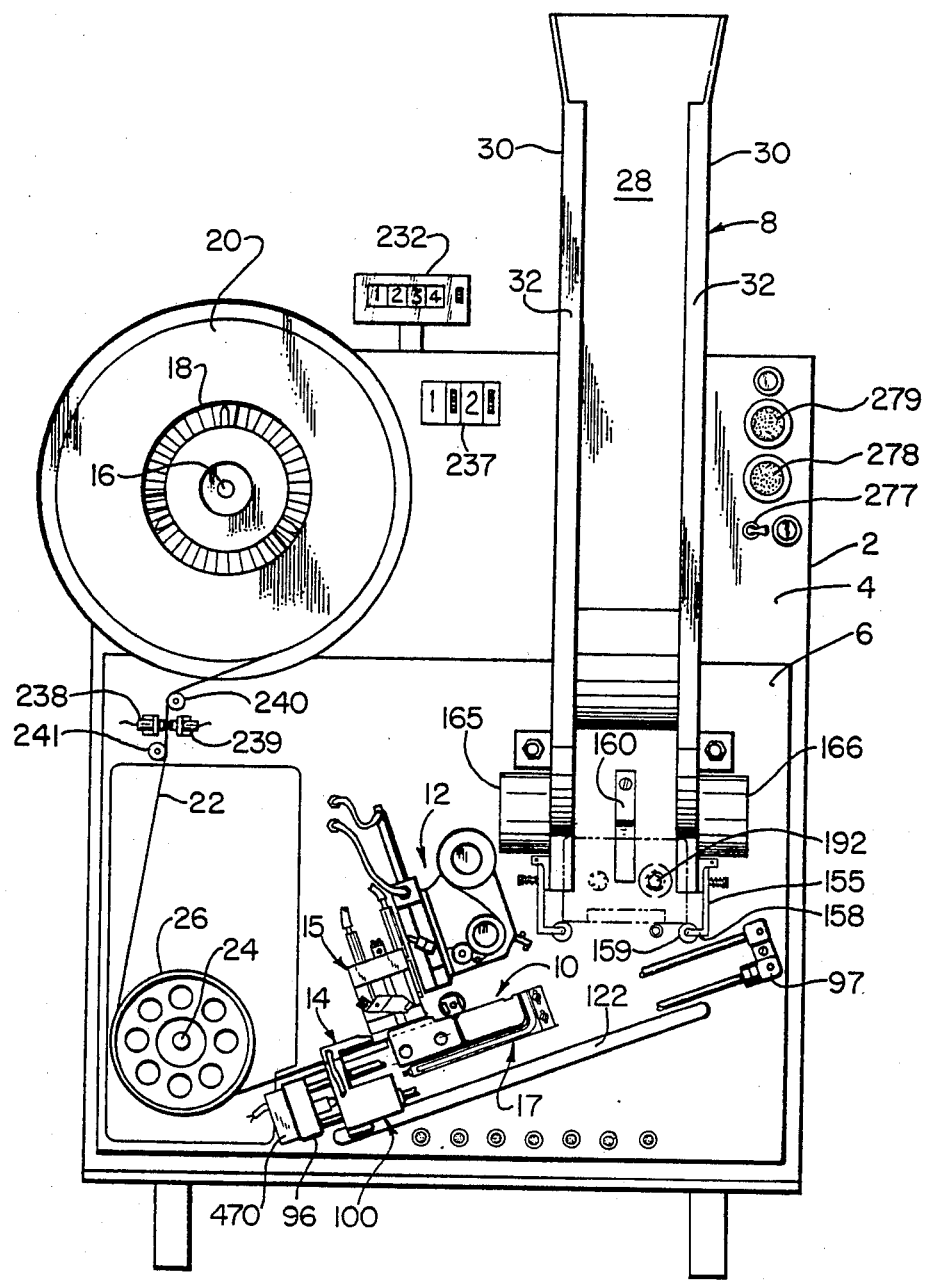

Referring now to FIG. 1, the illustrated machine is essentially similar to the machine disclosed in U.S. Published Application No. B 535,448, except that the splicing block assembly, and the leader extractor and diverter mechanisms have been modified for the purposes of this invention. The control system also has been changed correspondingly to effect the desired mode of operation. Accordingly, since U.S. Published Patent Application No. B 535,448 provides a complete and detailed description of the mechanical aspects of the machine, and in particular of portions of the machine which have no bearing on the present invention, for the sake of conciseness and to avoid obscuring the essence of the present invention, this specification is concerned primarily with the changes provided by the present invention and those portions of the machine which are not related directly to the invention are described herein only to the extent believed necessary to show an operative devive and to facilitate a full understanding and appreciation of the construction and mode of operation of the improvements which form the present invention.

Figure 5:
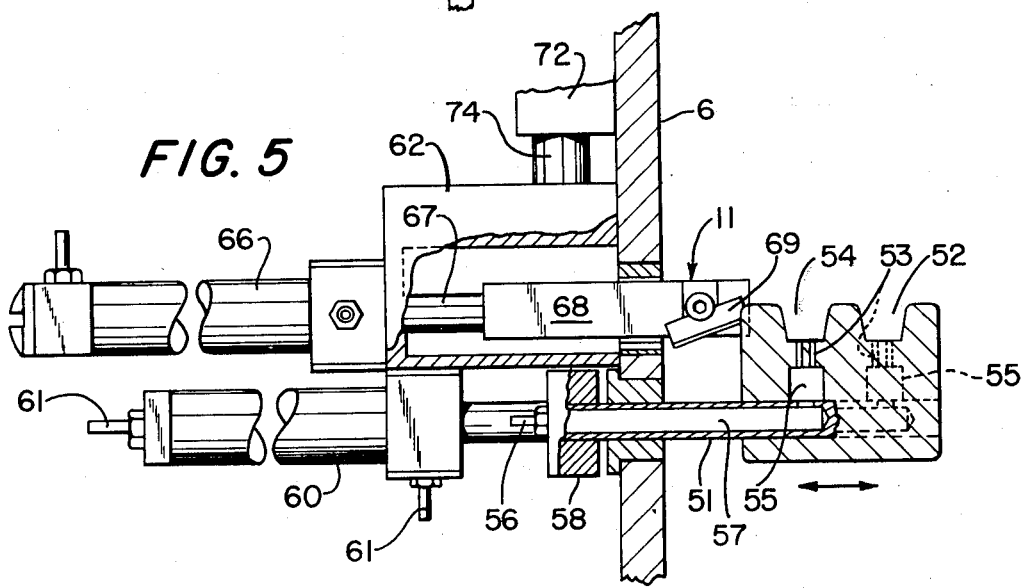
FIG. 5 is an enlarged cross-sectional view of the movable splicing block and related mechanism.

Referring now to FIG. 1, the illustrated machine comprises a housing 2 having a front panel 4 with a large opening that is closed off by a plate 6. The latter plate serves as a support for a number of means including a blank cassette storage magazine 8, splicing block assembly 10, a knife mechanism 11 (FIG. 5), a splicing tape dispenser applicator 12 and part of a leader extractor mechanism 14. Extending through the front panel 4 are a rotatable supply reel shaft 16 to which is affixed a hub assembly 18 for supporting and driving a reel 20 containing a supply of a magnetic tape 22 (hereinafter called "supply tape"), and a rotatable shaft 24 to which is affixed a counting wheel 26. Plate 6 also has an opening 190 (FIG. 6) through which a tape drive spindle 192 of a tape winding mechanism hereinafter described may be extended to engage and drive the hub of a cassette so as to wind tape into the cassette.

The plate 6 also supports a leader diverter and centering mechanism which comprises subassemblies 15 and 17 hereinafter described in accordance with this invention.

Referring now to FIGS. 1-4, magazine 8 is curved longitudinally and comprises rear wall 28 and parallel side walls 30 with internal flanges 32 at their front edges. The bottom end of the magazine engages and is attached to a pair of parallel cassette guide plates 36 (FIG. 2) that are secured to plate 6. The magazine is designed to accept and store blank cassettes 38 which generally are of the type shown in FIG. 1 of U.S. Pat. No. 3637153. The cassettes are loaded into the magazine so that their open front edges face the flanges 32. Since the cassettes are thicker along a substantial portion of their front edges, adjacent mutually engaging cassettes in the magazine are tilted with respect to one another. The cross-section of the interior space of the channel is slightly oversized with respect to the corresponding dimensions of the cassettes whereby the cassettes can assume an approximately right angle position with respect to rear wall 28 with enough clearance to allow the cassettes to advance freely downward in the magazine. The curvature of the magazine is set so that the bottom ends of rear wall 28 and flanges 32 extend almost perpendicular to plate 6 (see FIG. 4). Hence, the plane of each cassette will be substantially parallel to plate 6 as it moves out of the bottom of the magazine. The guides 36 extend below the lower end of the magazine (see FIGS. 1 and 3) and function to direct cassettes from the magazine to a selected loading position. The guides 36 have a U-shaped cross-section with the channels 43 formed between their front and rear sections 35 and 37 being just deep and wide enough to slidably accommodate the opposite ends of the cassette. The front sections 35 of guides 36 have notches 39 in line with the magazine. These notches are stepped to provide shoulders 41 to engage the lower ends of the magazine so that the magazine cannot protrude into the two channels 43. This assures that cassettes can move one by one out of the magazine through notches 39 up against sections 37 and then can drop vertically along the channels 43 formed by the two guides to a selected loading position as shown in phantom in FIG. 1. A weight in the form of a roller 45 may be disposed in the magazine to urge the cassettes to move downward.

Referring now to FIGS. 1-4, means are provided for releasably holding a blank cassette in position to be loaded. In the illustrated embodiment this particular means comprises a pair of spring-biased clips 155 which are pivotally attached to the guides 36 at 157. Each clip 155 is bent so as to provide an inturned bottom arm 158 that carries a roller 159. The two arms 158 extend toward one another far enough for rollers 159 to intercept opposite ends of the cassette 38 and to support that cassette in the desired loading position at the bottom ends of the guides.

The length of guides 36 below notches 39 is less than the height of a cassette and clips 155 are located so that the rear (i.e., upper) edge of the cassette which they support is slightly below the edges of the notches 39. Thus, when a first cassette is supported by clips 155 a second cassette can be inserted in between the guides through notches 39 and this second cassette can rest on the first cassette. A positive means is employed (see actuator 162) for forcing the second cassette to replace the first cassette after the latter has been loaded. When the first cassette is forced downward by the second cassette, it causes clips 155 to swing outwardly so that further movement of the cassette will force them to spread apart enough to release the first cassette. Clips 155 then spring back under the influence of springs 161 to their normal position to intercept the second cassette. The loaded cassette which has been released is discharged to a suitable receptacle (not shown).

Although clips 155 spring back quickly, a finite amount of time is consumed in such return action. Therefore movement of cassettes from the magazine to the desired loading position is required to be controlled so that when a loaded cassette is discharged, the next high cassette cannot reach the loading position until after the clips 155 have returned to cassette-intercepting position. In this connection it is to be noted that the guides 36 are set so as to permit a cassette disposed between them to fall freely under the influence of gravity. However, a leaf element 160 is attached to plate 6 between the guides 36. This spring element is located and shaped so that it engages the rear side of a cassette as soon as the first (i.e. lower) edge of the cassette drops below the notches 39. The lower end of the spring element 160 terminates short of the lower end of the guides 36, so that it will engage a cassette held in loading position by clips 155 for a limited distance below its trailing edge, preferably for about one half of the height of the cassette. Spring element 160 biases the cassette which it engages against the front sections 35 of guides 36 and thereby impedes downward movement of that cassette until the latter moves clear of it. It will also slow up downward movement of the next cassette as the latter is caused to move downward under the influence of a double-acting actuator 162. The latter is mounted to a plate 163 which is attached to the upper ends of guides 36. Piston rod 164 of actuator 162 extends through an oversized hole in plate 163 and is aligned with the rear (i.e. upper) edge of a cassette that is located between guides 36. When piston rod 164 is retracted, it cannot impede movement of a cassette from the magazine into the channels 43 of guides 36. However, when piston rod 164 is extended, it will engage the second cassette located between guides 36 and force it to move downward into loading position, thereby ejecting the first previously loaded cassette. Piston rod 164 is extended immediately after a cassette loading operation has been completed as hereinafter described and drives the second cassette at a controlled rate against the force of spring element 160. The first cassette rapidly accelerates under gravity away from the second cassette as it moves clear of spring-biased clips 155. As a consequence, ample time is afforded to permit clips 155 to snap back against guides 36 and stop the second cassette in the desired loading position.

Means also are provided to assure that actuator 162 can operate without interference from the next cassette of the magazine, that is the third cassette counting the two which are disposed between guides 36. The same means also assure that the second cassette will not get hung up on the next cassette. This particular means comprises two pneumatic brake units 165 and 166 attached to the guides 36 on opposite sides of the magazine. These pneumatic units are essentially single acting actuators having large brake pads 167 coupled to their pistons. The brake pads are forced outwardly when air pressure is applied to the actuators via inlet fittings 168 and are retracted by springs within the brake units when the air pressure is relieved. When brake pads 167 are extended they engage the bottommost cassette in the magazine (and preferably also at least the next higher cassette) but not the second cassette which is between guides 36. When the brake pads are extended, the bottommost cassette in the magazine is held so as not to interfere with movement of the second cassette by the piston rod 164. Brake units 165 and 166 are normally "off" and are turned "on" momentarily to allow the piston rod 164 to drive the second cassette down and eject the loaded cassette from the machine. The brake units are turned off agains as piston rod 164 is retracted so as to allow the third cassette to move into the position previously occupied by the second cassette.

The leader extractor mechanism 14 is designed to withdraw a leader from a cassette held in loading position and to transport the leader and position it onto the splicing block assembly 10 where it is cut into two leader sections and spliced to a length of supply tape by operation of knife mechanism 11 and splicing tape dispenser-applicator 12.

Referring now to FIGS. 1-3, 5, 6, 12 and 13, the splicing block assembly comprises a stationary splicing block 40 affixed to plate 6 and a movable splicing block 42. Stationary block 40 has a flat upper surface in which is formed a single groove 46 which functions as a tape guideway. The base of groove 46 is provided with a series of small apertures 53 which communicate through an interior passageway (not shown) in block 40 to a hose fitting 49 (FIG. 6) that is carried by block 40 and projects through the rear side of plate 6. Hose fitting 49 is connected through suitable hoses and a valve means hereinafter described to a source of vacuum whereby a suction force can be established which will hold a tape tight against the bottom of the groove 46.

The movable splicing block 42 is mounted on two parallel slide rods 50 and 51 which are slidably disposed in openings in plate 6. The block 42 has a flat upper surface with two parallel grooves 52 and 54 which are identical in shape to groove 46 and extend parallel thereto. These grooves also have a series of small apertures 53 formed in their bases so that suction may be applied to tapes positioned in the two grooves. The movable block 42 is provided with two interior passageways 55 that communicate with the apertures 53 and have ports that communicate with longitudinally extending bores 57 formed in the slide rods. Hose fittings 56 are mounted in the rear ends of slide rods 50 and 51 and are connected through hoses (not shown) to a suitable source of vacuum through control valve means hereinafter described, so that suction may be selectively applied to hold tapes tight against the bottom of grooves 52 and 54.

Splicing block 42 is movable in and out relative to plate 6 so as to selectively align either of the grooves 52 and 54 with groove 46. The movable splicing block is operated by means comprising a cross block 58 (FIGS. 5 and 6) which is attached to the rear ends of slide rods 50 and 51 and is adapted to be reciprocated by a fluid actuator 60 which is secured to a large block 62 affixed to the rear side of plate 6. By appropriately applying air to actuator 60 via one or the other of its hose fittings 61, its piston rod can be reciprocated so as to move the slicing block from the position of FIG. 1 where the groove 52 is aligned with groove 46 and the position of FIGS. 5 and 13 where the groove 54 is aligned with groove 46.

The knife mechanism 11 comprises a double-acting actuator 66 which is attached to block 62 and has a piston rod 67 which extends through an oversized hole in block 62 and carries an elongate cutter blade support arm 68. The latter arm is aligned with an aperture in plate 6 and carries a cutter blade 69 at its front end. Cutter blade 69 is mounted in line with a small gap 44 between splicing blocks 40 and 42, with its cutting edge facing down as shown. Normally actuator 66 is set so that arm 68 is withdrawn far enough for the cutting blade not to interfere with movement of tape along groove 46. When actuator 66 is actuated so as to extend its piston rod, the cutter blade moves forward to cut through whatever tape is extending across from splicing block 40 to splicing block 42.

The splicing tape dispensing and applicating unit 12 is adapted to apply a piece of adhesive-backed splicing tape to the abutting ends of two tapes supported by the two splicing blocks. The unit 12 comprises a carriage plate 70 that is attached to an arm (not shown) that extends through a slot in plate 6 and forms part of a slide block 72 (FIG. 6) that is slidably mounted on two slide rods 74 and 75 whose ends are secured in block 62 mentioned previously and a second block 76 attached to the rear side of plate 6. Block 76 supports an actuator 78 whose piston rod (not shown) extends through an oversized hole in block 76 and is secured to slide block 72. By suitable application of air to actuator 78, slide block 76 can be made to reciprocate up and down on rods 74 and 75 so as to cause plate 70 to reciprocate in the same manner.

Carriage plate 70 is adapted to rotatably support a supply roll 82 of splicing tape 84 and carries means (not specifically described herein) which causes a predetermined amount of splicing tape to be pulled off of the supply roll 82 when the carriage plate is moved upwardly, and means including a plunger 95 which is reciprocated by an actuator 94 and is adapted to sever a portion of splicing tape 84 and apply the severed section of splicing tape to the abutting ends of two tapes on splicing blocks 40 and 42 when the carriage plate 70 moves downward. The severed section of splicing tape is held against the bottom face of the plunger by suction applied via a hose fitting 93 which leads to openings in the bottom face.

Figure 2:
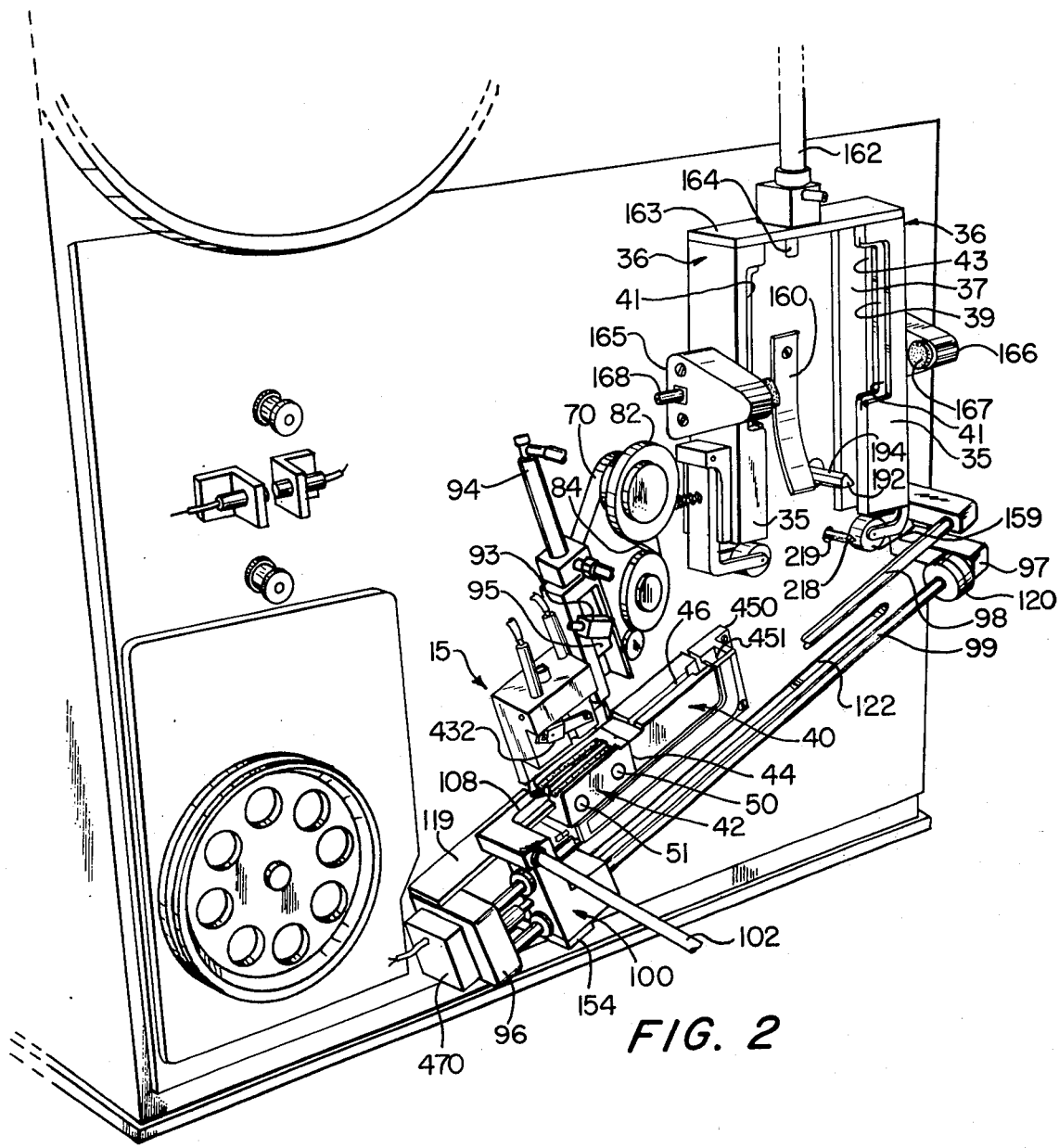
FIGS. 2 and 3 are enlarged perspective views of the same maching showing the two limit positions of the leader extractor assembly.
Figure 4:
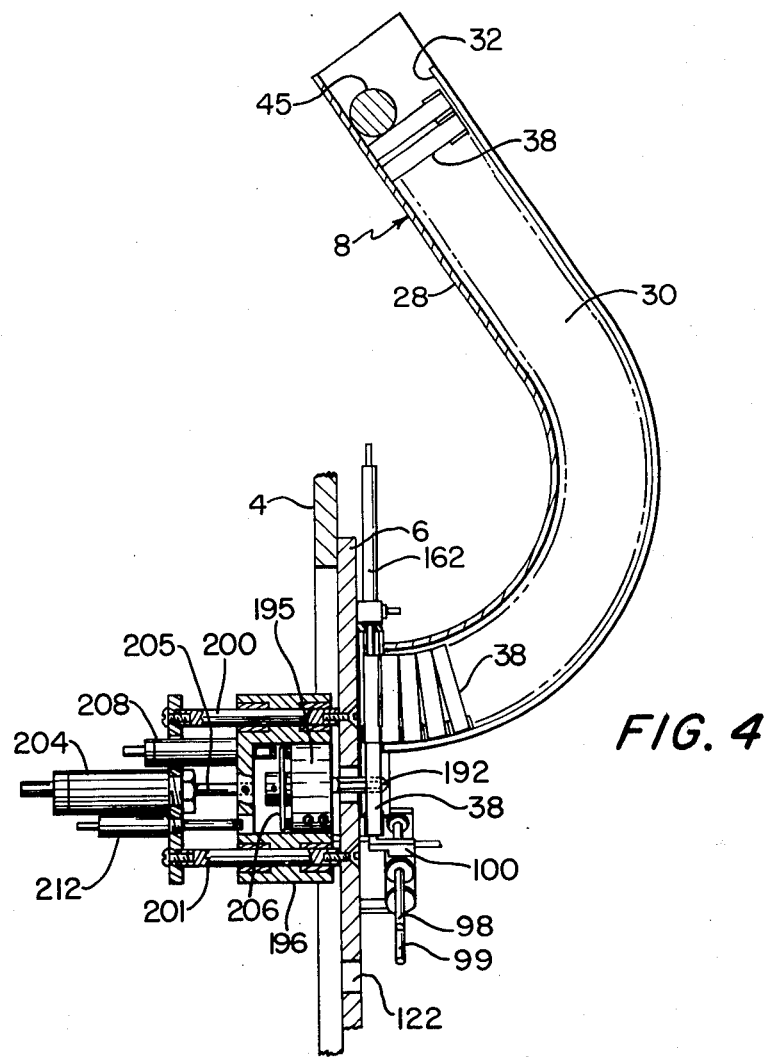
FIG. 4 is a sectional view taken to one side of the center line of the magazine.
Figure 6:
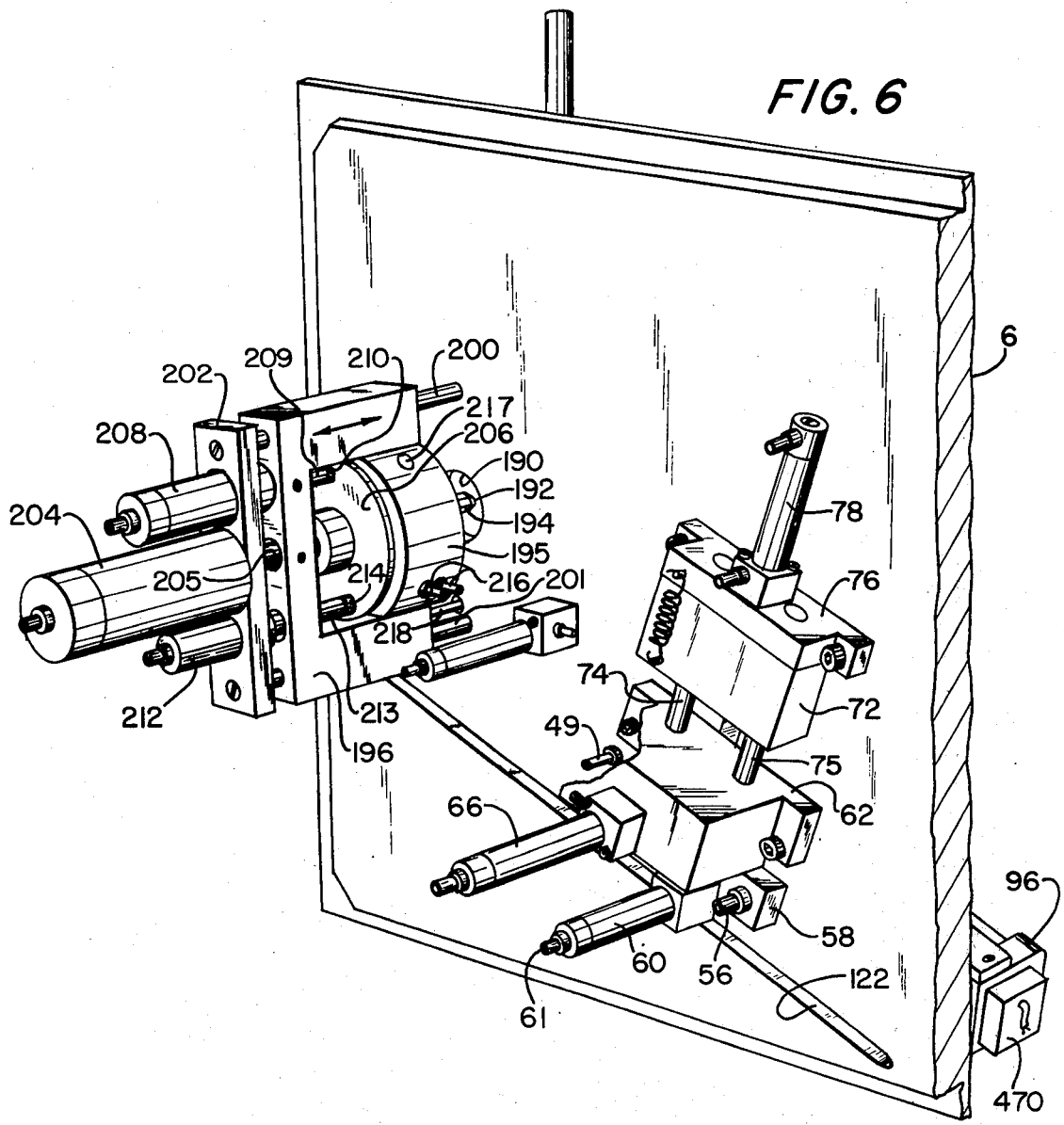
FIG. 6 is a perspective view of some of the operating means on the rear side of the front panel of the machine of FIG. 1.

The tape winding mechanism for loading supply tape into a cassette after it has been spliced to one of the leader sections is shown in FIGS. 2, 4 and 6. Drive spindle 192 is formed with teeth 194 for interlocking with mating teeth (not shown) on the inner peripheral surface of the hub of a cassette in loading position. Provision of teeth on cassette hubs so that the hubs may be driven by a complementary spindle is standard practice in the art as shown, for example, by U.S. Pat. Nos. 3637153 and 3814343. Drive spindle 192 forms part of the output shaft of an air turbine 195 whose housing is attached to a yoke 196 that is slidably mounted on two rigid slide rods 200 and 201 that are secured at one end to plate 6 and at the other end to a connecting plate 202. A double acting pneumatic actuator 204 is attached to plate 202 and has a piston rod 205 which extends through an oversized hole in plate 202 and is affixed to yoke 196. Actuator 204 can be operated so as to move turbine 195 toward and away from plate 6. When actuator 204 is operated so as to move turbine 195 toward the plate 6, drive spindle 192 will project through opening 190 far enough to engage one of the hubs of a cassette located in loading position. When actuator 204 is reversed, spindle 192 is retracted far enough to disengage itself from the same cassette and permit the cassette to be discharged from the machine. A brake disc 206 is affixed to the rear end of the outward shaft of turbine 195 in position to be selectively engaged by brake pad 210 which is carried by the piston rod 209 of a single-acting actuator 208. Actuator 208 is affixed to yoke 196 and the cylinder of the actuator is slidably accommodated in an oversized hole in plate 202 so as to not interfere with movement of yoke 196. Piston rod 209 of actuator 208 extends through an oversized hole in yoke 196. Brake pad 210 is normally disengaged from disc 206 and is forced into engagement with disc 206 to stop spindle 192 when air is applied to actuator 208. Another smaller single acting pneumatic actuator 212 is attached to plate 202. The piston rod 213 of actuator 212 extends through an oversized hole in yoke 196 and has a brake pad 214 at its free end for engaging disc 206 when pressurized air is applied to the actuator. Actuator 212 and its pad 214 serve as a snubber to engage brake disc 206 when turbine 195 is retracted by operation of actuator 204.

The housing of turbine 195 has two inlets 216 for application of pressurized air to drive its outward shaft in a "forward" or "wind" direction and an outlet 217 for exhausting air from the turbine housing. One of the inlets 216 is used to operate the turbine at a high speed and the other inlet 216 is used to operate it at a slower speed. Further details of the construction of the air turbines are not believed necessary to an understanding of the present invention since such devices are well known and are disclosed, for example, in U.S. Pat. Nos. 3637153, 3717314, 3737358, 3753834, 3753835 and 3787270. Also, if desired, turbine 195 may be replaced by a two-speed electric motor.

Referring to FIGS. 2 and 6, a pin 218 is mounted in the front end of the lower leg of yoke 196 to one side of spindle 192 and in line with an opening 219 located between the cassette supporting arms 148 of clips 155. The length of pin 218 is such tht it will not protrude through opening 219 except when yoke 196 is moved forward, and then pin 218 will extend beneath a cassette supported by clips 155 in position to separate the lower and upper portions 184A and B of an extracted leader (see FIG. 14). Yoke 196 is moved forward only after finger 108 of the leader extractor mechanism hereinafter described has extracted a leader from a cassette disposed in loading position and has commenced carrying the leader back toward the splicing block assembly, whereby pin 218 is prevented from striking the finger 108.

Figure 10:
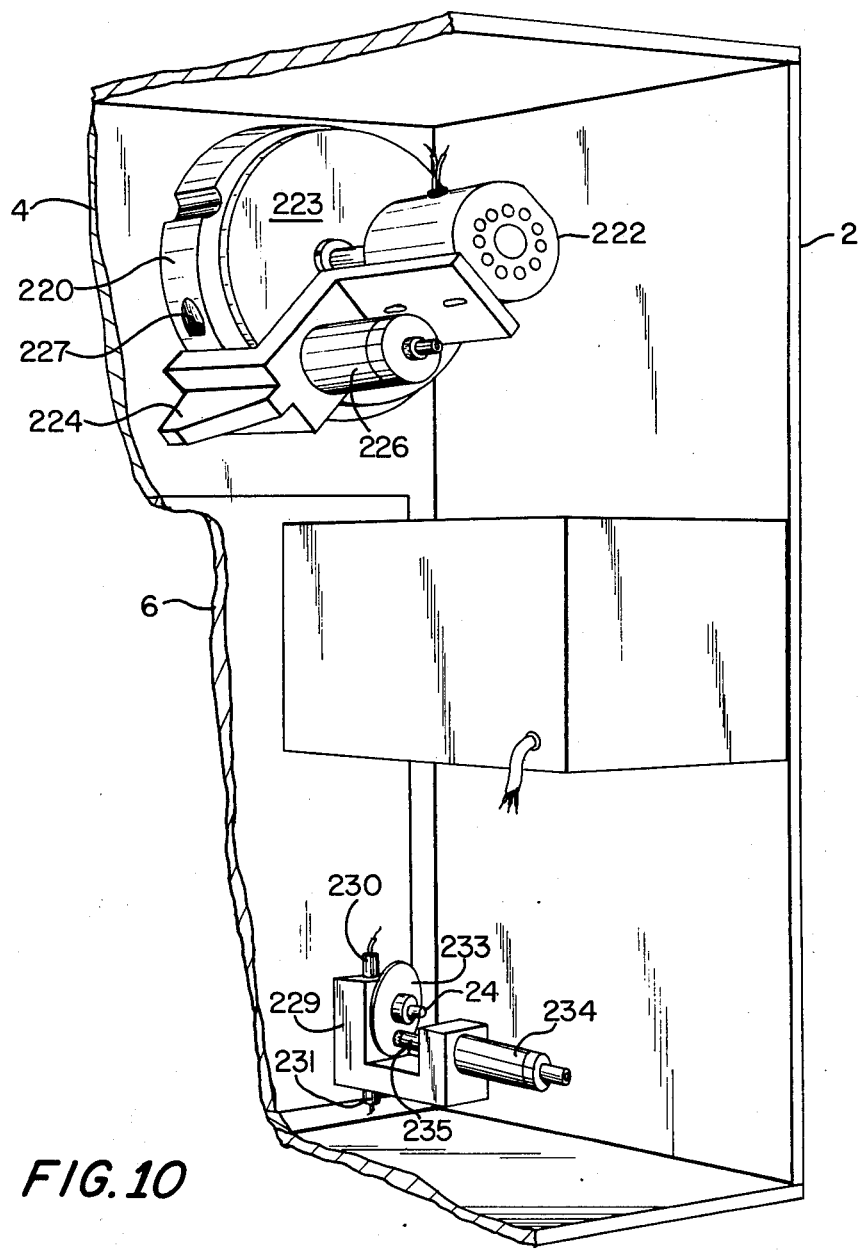
FIG. 10 is a perspective rear view of a portion of the same machine.

Turning now to FIG. 10, the supply reel spindle 16 forms part of the output shaft of an air turbine 220 which is constructed substantially the same as but is larger than turbine 195 and is attached to the rear side of front panel 4 by means of a supporting bracket 224. The rear end of the output shaft of the turbine is coupled by a non-slip connection to the shaft of an electric motor 222, and a brake disc 223 is also mounted on and secured to the turbine's output shaft. Bracket 224 also carries a single acting pneumatic actuator 226 whose piston rod carries a brake pad, (not shown) similar to brake pad 210. When actuator 226 is pressurized with air, its piston rod is extended to form its brake pad against brake disc 223 to stop the supply reel spindle. Turbine 220 has a slow speed "reverse" air inlet 227 whereby it may be driven in a direction to wind a supply tape onto the supply reel. Turbine 220 also has an exhaust port (not shown) for exhausting air from its housing. Motor 222 may be reversible but preferably it is unidirectional and is adapted to drive the supply reel spindle in a forward direction, which is clockwise as seen in FIG. 1.

The counter wheel shaft 24 is rotatably supported in a block 229 attached to the rear side of front panel 4. Block 229 carries a light source 230 adapted to direct a light beam transversely of shaft 24 and a light detector 231 for detecting the light beam. Although not shown, it is to be understood that shaft 24 has a slot or transverse opening through which the light beam can reach light detector 231 only when the shaft reaches a particular angular position. Detector 231 will produce a signal pulse once for each revolution of shaft 24 and, since the circumference of counter wheel 26 is fixed, the number of feet or centimeters of supply tape 22 transported from reel 20 can be determined by multiplying the number of signal pulses by the circumference of the counter wheel. The output pulses from detector 231 are fed to and counted by an electronic counter 232 (FIG. 1) of a type which can be programmed to produce an output control pulse and also to reset itself when the number of input pulses has reached a determined count. The use of the counting wheel and counter as above described is old in cassette loading machines and further details regarding the same are provided by the above-listed U.S. patents. A single acting pneumatic actuator 234 carried by block 229 has a brake pad on the end of its piston rod 235 and is adapted so that when actuated its brake pad will engage a brake disc 233 attached to the rear end of counter wheel shaft 24, thereby stopping rotation of the counter wheel.

Figure 3:
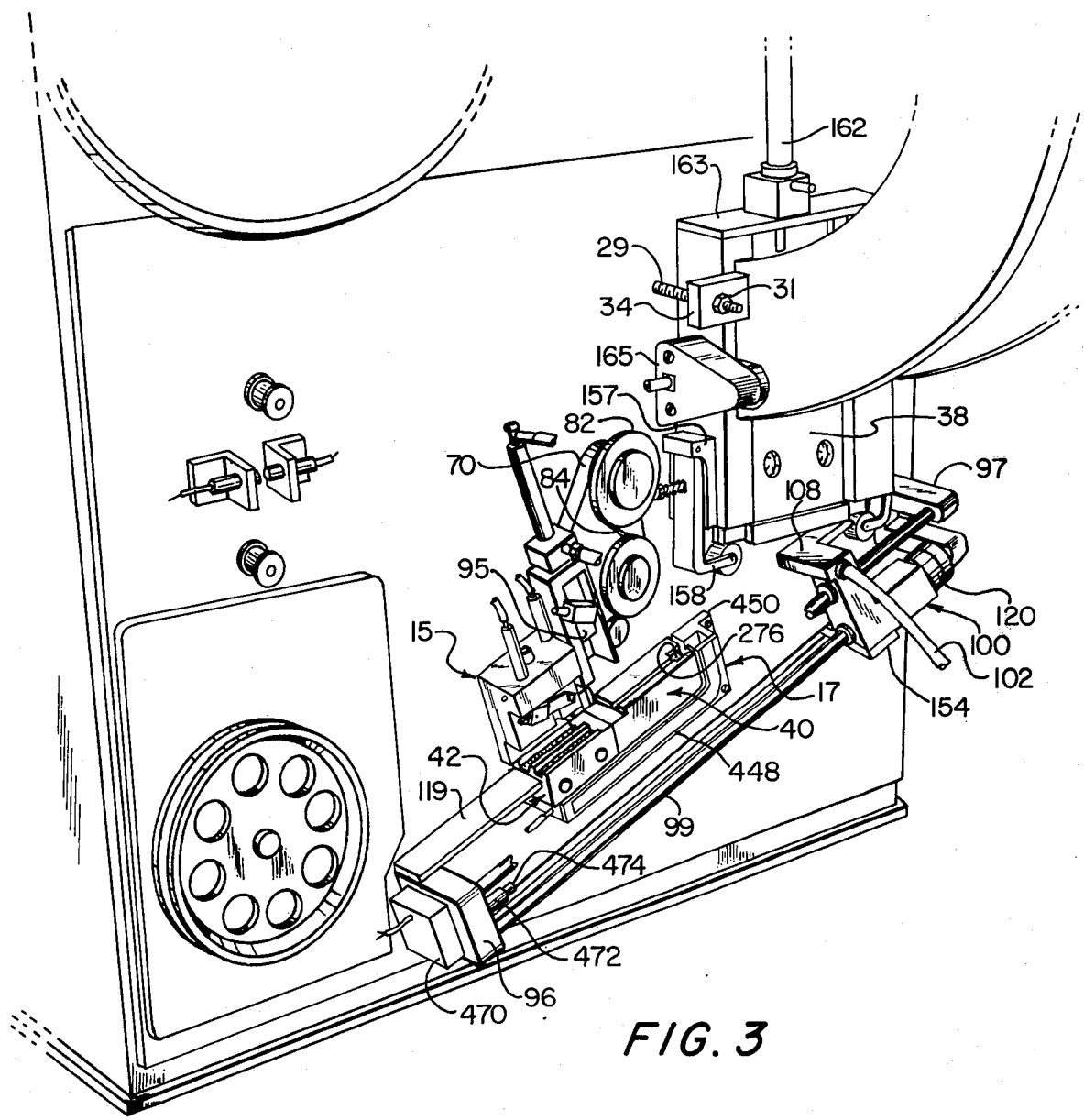
Figure 7:
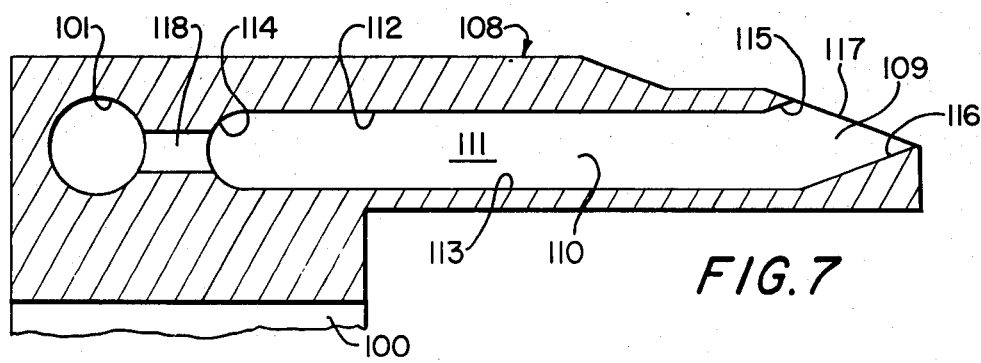
FIG. 7 is a longitudinal sectional view on an enlarged scale of a portion of the leader extractor mechanism.

The leader extracting and positioning mechanism 14 is shown in FIGS. 1–3, 8 and 9 and comprises a pair of end support members 96 and 97 which are attached to plate 6 and carry two parallel and vertically spaced slide rods 98 and 99 which slidably support a leader extractor carriage 100. Slide rolls 98 and 99 extend parallel to the inclined upper surfaces of splicing blocks 40 and 42, with the latter blocks being located between the two slide rods on the one hand and plate 6 on the other hand. As seen in FIGS. 2 and 7, the carriage 100 is formed with a hollow chamber 101 having a port to which is coupled a flexible hose line 102 which leads to a vacuum pump (not shown) so that chamber 101 may be subjected to a suction force. Carriage 100 comprises a hollow finger 108 with an opening 109 at its free end. The interior chamber 110 of finger 108 is defined by flat side surfaces (one of which is shown at 111 in FIG. 7), flat top and bottom surfaces 112 and 113 and a concave rear surface 114. At the free end of the finger the surfaces 112 and 113 are angulated upwardly as shown at 115 and 116 and the upper side is bevelled as shown at 117 so that opening 109 is inclined to the longitudinal axis of the finger. Chambers 101 and 110 are connected by a passageway 118. Finger 108 extends parallel to slide rods 98 and 99 and is aligned with groove 46 of splicing block 40. Finger 108 also is elevated slightly above splicing blocks 40 and 42 so that it can move over the splicing blocks as it moves from its normal at-rest position (FIGS. 1 and 2) to its leader extracting position (FIG. 3). In the latter position finger 108 extends immediately beneath the front edge of a cassette 38 disposed in loading position. A collar 120 adjustably secured on the upper end of slide rod 99 is located so as to stop carriage 100 when the free end of finger 108 is close to or lightly engages the cassette disposed in loading position between guides 36. A plate 119 on the upper side of end support member 96 extends towards splicing block 42 below the level of finger 108 and serves to prevent the supply tape from drooping down between the end support member 96 and splicing block 42.

Movement of carrier 100 is accomplished by means of a drive mechanism which is illustrated in FIGS. 8 and 9. As seen in FIG. 2, an elongated slot 122 is formed in plate 6 below the level of and parallel to slide rod 99 for the purpose of accommodating a piston of the drive mechanism hereinafter described for the carriage 100. The drive mechanism comprises an angle plate 124 attached to the bottom wall 125 of the housing 2. Angle plate 124 supports a rotary actuator 126 which is disposed so that the longitudinal axis of its cylinder is inclined parallel to slot 122. Actuator 126 is of conventional construction and comprises a block 128 which is attached to angle plate 124. Block 128 has a bore 129 of circular cross section within which is disposed a piston rod 133. Block 128 has another bore 136 which is formed at a right angle to and partially intersects bore 129. Secured in bore 136 is a bearing assembly 137 that rotatably supports a shaft 138 which carries a gear 139 whose teeth engage teeth 135 formed on piston rod 133. The actuator's cylinder comprises a pair of cylindrical tubes 131A and B disposed in two counterbores formed in block 128 and secured to block 128 by four tie rods 140 that are coupled to headers 132. Headers 132A and B are provided with like holes 142A and B respectively that communicate with and serve as ports for tues 131A and B. Holes 142A and B are adapted to receive suitable hose fittings (not shown) for connecting tubes 131A and B to a supply of compressed air via a hose line and a suitable control valve (not shown). Tubes 131A and B and bore 129 coact to form a pneumatic cylinder. If compressed air is applied to one end of the cylinder via hole 142A and air pressure is relieved from the opposite end of the cylinder via the opposite hole 142B, the piston rod will be forced toward header 132B and shaft 138 will rotate in a first direction. If subsequently compressed air is applied to the cylinder via hole 142B and the other end of the cylinder is vented via hole 142A, the piston rod will move toward header 132A and the shaft will turn in the opposite direction. The limits of travel of the piston rod 133 are determined by engagement of the pistons 134 (only one of which is shown) with headers 132A and 132B.

Supported on stub shafts affixed to a plate 146 which is attached to block 128 are three idler pulleys 148A, B and C. Shaft 138 extends through an oversized hole (not shown) in plate 146 and affixed to the end of the shaft is a large wheel 147 having a flat groove formed along its circumference. Pulley 147 is formed with a radial slot and the opposite ends of a flexible, non-stretchable belt 150 are secured in a radial slot by means of two anchor plates 151 that are attached to the wheel at opposite sides of its radial slot. Commencing at one end belt 150 extends in turn around a relatively large portion of the circumference of pulley 147 and around pulleys 148C and 148B, along the front edge of plate 146 to pulley 148A, around pulley 148A and back to pulley 147. Attached to belt 150 is a coupling member 153 which is formed with a rigid arm 154 that extends through slot 122 and is attached to the underside of carriage 100. When piston rod 133 of actuator 126 is driven to one end of the actuator's cylinder, pulley 147 drives belt 150 in a direction to position arm 154 and carriage 100 as shown in FIGS. 1 and 8. When actuator 126 is operated so that piston rod 133 is moved to the other end of its cylinder, pulley 147 drives belt 150 in the opposite direction far enough for coupling member 153 to transport carriage 100 to the position shown in FIG. 3. Vacuum is applied to finger 108 as it moves to the position of FIG. 3, so that the leader of a cassette in loading position is sucked into chamber 110, and the vacuum is maintained as the carriage returns to the position of FIG. 1, whereby the leader is withdrawn from the cassette and transported by finger 108 over the splicing blocks 40 and 42.

To the extent described by the foregoing description, the machine is essentially the same as the machine disclosed in U.S. Published Patent Application No. B 535,448, now U.S. Pat. No. 3,997,123, and, therefore, reference may be had to that publication for further details of construction which have not been specifically described herein for the purpose of brevity.

The machine disclosed in said U.S. Published Patent Application No. B 535,448, now U.S. Pat. No. 3,997,123, also includes a leader diverter mechanism for assuring that the upper part 184A of the loop formed by the extracted leader will not interfere with the winding and splicing operation. While a leader diverter as disclosed in said published application may be used in a machine having leader centering means as provided by this invention, it is preferred to use a new leader diverter mechanism as shown in detail in FIGS. 11-14 (see also FIGS. 1-3). This novel leader diverter mechanism forms part of the subassembly 15 which comprises a support block 400 which is attached to movable splicing block 42 by means of a pair of screws, only one of which is shown at 401. Mounted in a hole at one end of block 400 is a pneumatic actuator 402 whose piston rod 403 carries a yoke 404 which is pivotally connected to one end of a link 406. Pivotally attached to the same end of block 400 by means of a pivot pin 408 is a leader diverter member 410 which comprises a diverter arm 412 and an operating arm 414 that extends at an angle to arm 412. Link 406 is pivotally connected by means of a pin 415 to arm 414, while the diverter arm 412 is formed with a recess 416 and a hook 418 at its free end. Pivot pin 408 extends parallel to the tape grooves 52 and 54, so that operation of actuator 402 will cause the diverter arm 412 to swing in a line which extends transversely to grooves 52 and 54 and the plane of support plate 6. Actuator 402 is held in place in support block 400 by means of a set screw 420 and preferably the actuator is of the single acting type, with air being introduced at its upper end via a fitting 422 when it is desired to extend piston rod 403 and the piston rod 403 returning to its retracted position when air pressure is relieved from the cylinder of the actuator as a consequence of the bias exerted by a spring (not shown) contained within the housing of the actuator. Piston rod 403 is normally in a fully retracted position so that the diverter member 410 is in the dotted line position shown in FIG. 12, and diverter member 410 is shifted to the position shown in solid lines by application of pressurized air to actuator 402 after a leader has been extracted from the cassette and drawn over the splicing block assembly. A shoulder 417 on block 400 intercepts arm 414 and thereby limits extension of member 410.

Figure 11:
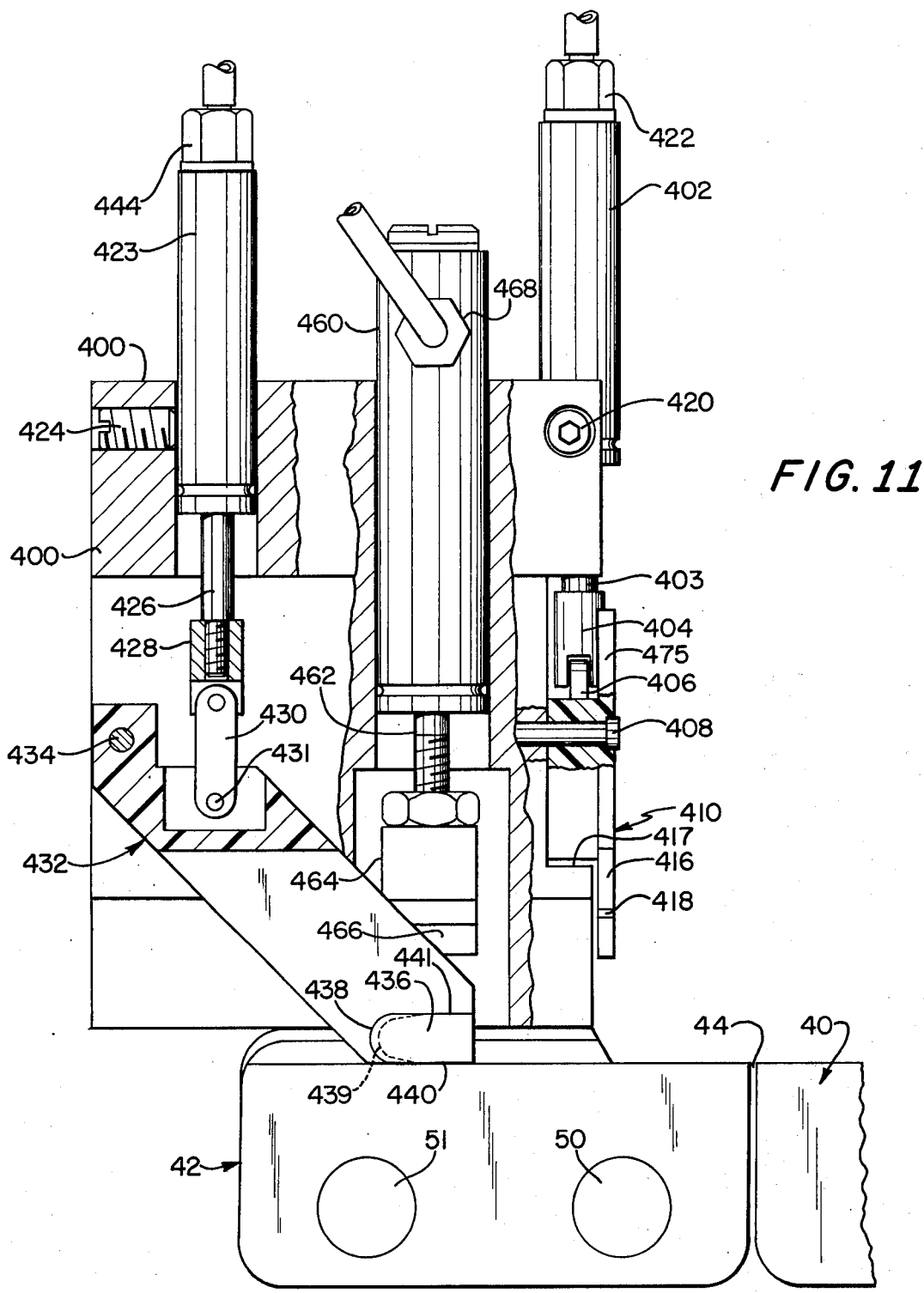
FIG. 11 is an enlarged elevational view, partly in section illustrating certain features of the leader positioning and diverting mechanisms.
Figure 12:
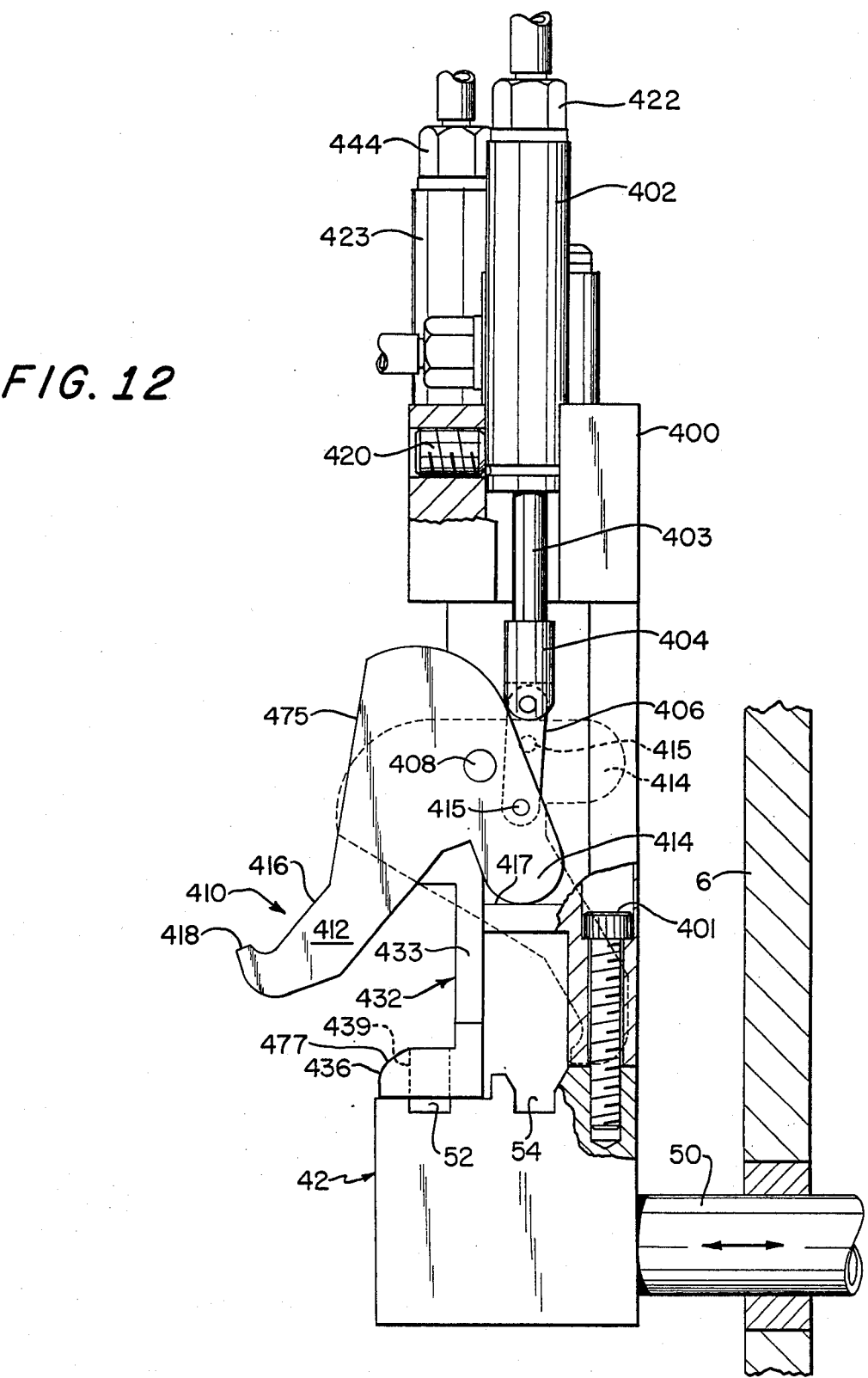
FIG. 12 is an elevational view, partly in section, of the leader diverter mechanism taken at a right angle to the view of FIG. 11.
Figure 13:
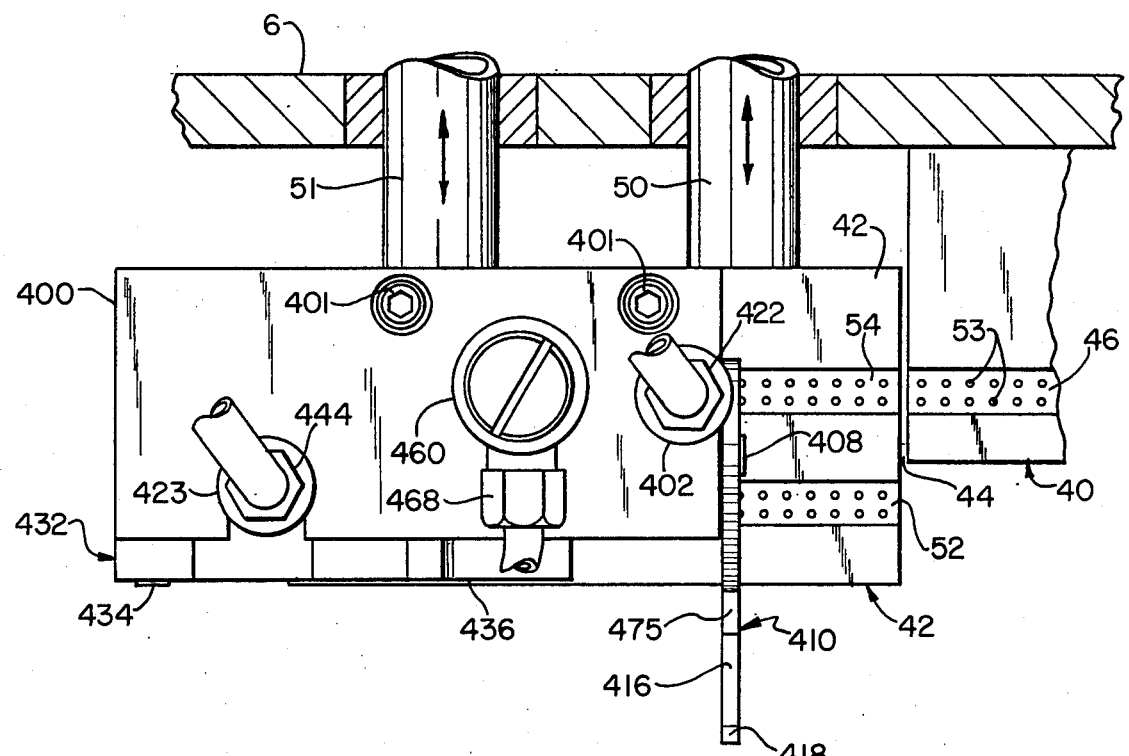
FIG. 13 is a plan view of the apparatus of FIG. 11.

In accordance with this invention, the machine comprises means for locating or centering the extracted leader on the splicing block assembly so as to assure that the leader will be cut by the knife mechanism substantially at its midpoint. This means comprises two distinct units. One unit forms part of subassembly 15 and is carried by support block 400. It comprises a single-acting pneumatic actuator 423 whose cylinder is held in a hole in support block 400 by means of a set screw 424. A yoke 428 is affixed to the end of its piston rod 426 and a link 430 is pivotally connected at one end to yoke 428. The opposite end of link 430 is connected by means of a pivot pin 431 to a tape restraining arm 432 which is pivotally attached at one end to support block 440 by means of a pivot pin 434. The opposite end of restraining arm 432 is provided with a lateral extension 436 whose surface is rounded at one end as shown at 438. Arm 432 is arranged and disposed so tht its body section 433 is located between grooves 52 and 54 and its extension 436 extends across and at a right angle to groove 52 (see FIG. 12). Extension 436 is formed with a groove 439 in its curved surface 438, the base of groove 439 having essentially the same generally circular curvature of surface 438 and the groove having a width substantially the same as the width of grooves 52 and 54. The bottom and upper surfaces 440 and 441 of extension 436 are substantially flat and the extension is formed so that when piston rod 426 is extended, its surface 440 will lie flat against the upper surface of splicing block 42 as shown in FIGS. 11 and 12. Additionally groove 439 is formed so that it is in vertical alignment with groove 52. When the actuator 423 is in relaxed position, i.e., without any air pressure applied to its inlet fitting 444, restraining arm 432 is raised above splicing block 42 as shown in FIGS. 1-3. When air is admitted to fitting 444, piston rod 426 and restraining arm 432 are forced downwardly so as to place the lower surface 440 of lateral extension 436 in engagement with the upper surface of splicing block 42 (FIGS. 11 and 12). The upper position of arm 432 is determined by its engagement with a shoulder 433 on block 400.

The other part of the leader centering mechanism consists of sub-assembly 17 which comprises a vacuum chamber or plenum 448 disposed adjacent to splicing block assembly 10 (see FIGS. 1-3 and 14). For the sake of clarity, leader extractor carriage 100 and extractor finger 108 are omitted from FIG. 14.

Vacuum chamber 448 is carried by a plate 450 which is attached to plate 6. As seen best in FIG. 14, vacuum chamber 448 is formed preferably of a transparent material and is generally L shaped when viewed in profile. More particularly vacuum chamber 448 comprises an elongate section 450 which extends parallel to and beneath splicing blocks 40 and 42 and a relatively short section 452 which extends upwardly alongside the upper end of splicing block 40. The upper end of the relatively short section 452 of the vacuum chamber is open as shown at 451 in FIG. 2, while the remote end of elongate section 450 is closed off by an end wall 452 which has a port (not identified) and a hose fitting 454 mounted in that port. The port in the end wall 452 is formed by drilling a hole in and close to the inner side of the end wall, so that at the inner end of the port a groove 456 is formed in the inner wall of the elongate portion 450 of the vacuum chamber. Fitting 452 is connected by a hose to a source of vacuum through appropriate valve means hereinafter described so that a vacuum can be applied to chamber 448 to create a suction effect at open end 451.

The block 400 also supports a tape clamp mechanism which consists of a single acting actuator 460 which is secured in a hole in the block and which has attached to the end of its piston rod 462 a head 464 with a pad 466. Piston rod 462 is aligned with tape groove 54 and pad 466 is elongated in a direction parallel to and has a width slightly less than that of groove 54, whereby the pad may be received by the groove. Piston rod 462 is normally in the retracted position of FIG. 11. However, when actuator 460 is operated by application of high pressure air to its inlet fitting 468, piston rod 462 is advanced far enough for pad 466 to engage and hold down a tape located in groove 54.

Referring to FIGS. 1-3 and 6, the machine further includes a switch 470 which is attached to support member 96. The latter is provided with a hole in which is secured a sleeve 472. Sleeve 472 projects beyond support member 96 far enough for it to intercept and act as a stop for carriage 100. Switch 470 is of the type having a spring-biased operating button (not shown) and in this case the operating button has an extension in the form of an elongated rod 474 which is slidably received in and projects from sleeve 472 far enough for it to be engaged and depressed by carriage 100 when the latter is in the position of FIGS. 1 and 3. Switch 470 is normally open and is held closed by carriage 100 until the carriage commences its movement toward the position of FIG. 3, whereupon the switch automatically reopens. Switch 470 forms part of the control system hereinafter described.

The machine may be used to load cassettes with blank or pre-recorded tape. For the latter case the machine may be provided with a magnetic read head 276 installed in splicing block 40 (FIG. 3) to monitor Cue signals carried by the pre-recorded tape and to generate a control signal which causes the control system to stop turbine 195 and motor 222 and thereby terminate the winding operation when a full album or recording has been wound into the cassette.

The machine also includes as shown in FIGS. 1 and 17, an ON-OFF power toggle switch 277, a normally open push button START switch 278 and an EMERGENCY STOP switch 279, all mounted in panel 4 and forming part of the electrical control system of the machine.

Two additional control features are provided. One feature is a manually programmable counter 237 mounted to front panel 4. Counter 237 is provided to count the number of cassettes that are loaded by the machine and is preset to produce an output pulse when a predetermined number of cassettes have been loaded. Thus, the input terminal of counter 237 is connected to switch 252D (FIG. 15) and indexes its count by one each time programmer #2 (hereinafter described) operates through a complete cycle. In practice, counter 237 is set so that its output pulse is generated when the amount of tape consumed in loading a predetermined number of cassettes is just shy of the amount of tape originally carried by supply reel 20. Counter 237 is particularly advantageous when the supply tape contains a number of pre-recorded "albums," in which case it is programmed to produce an output pulse when the number of cassettes that have been loaded equals the number of albums on the supply reel.

The other feature is an optical detector for detecting when the supply reel has been emptied. The detector comprises a light source 238 and a detector 239 mounted on front panel 4 between the supply reel and the counting wheel. A pair of idler rollers 240 and 241 mounted on front panel 4 serve to guide the tape in a straight line between light source 238 and detector 239. The latter produces an output control signal only when it receives light from source 238, which occurs when no supply tape is located between it and light source 235.

The outputs of counters 232 and 237 and detectors 231 and 239 are utilized by the control system of the machine as hereinafter described.

Figure 15:
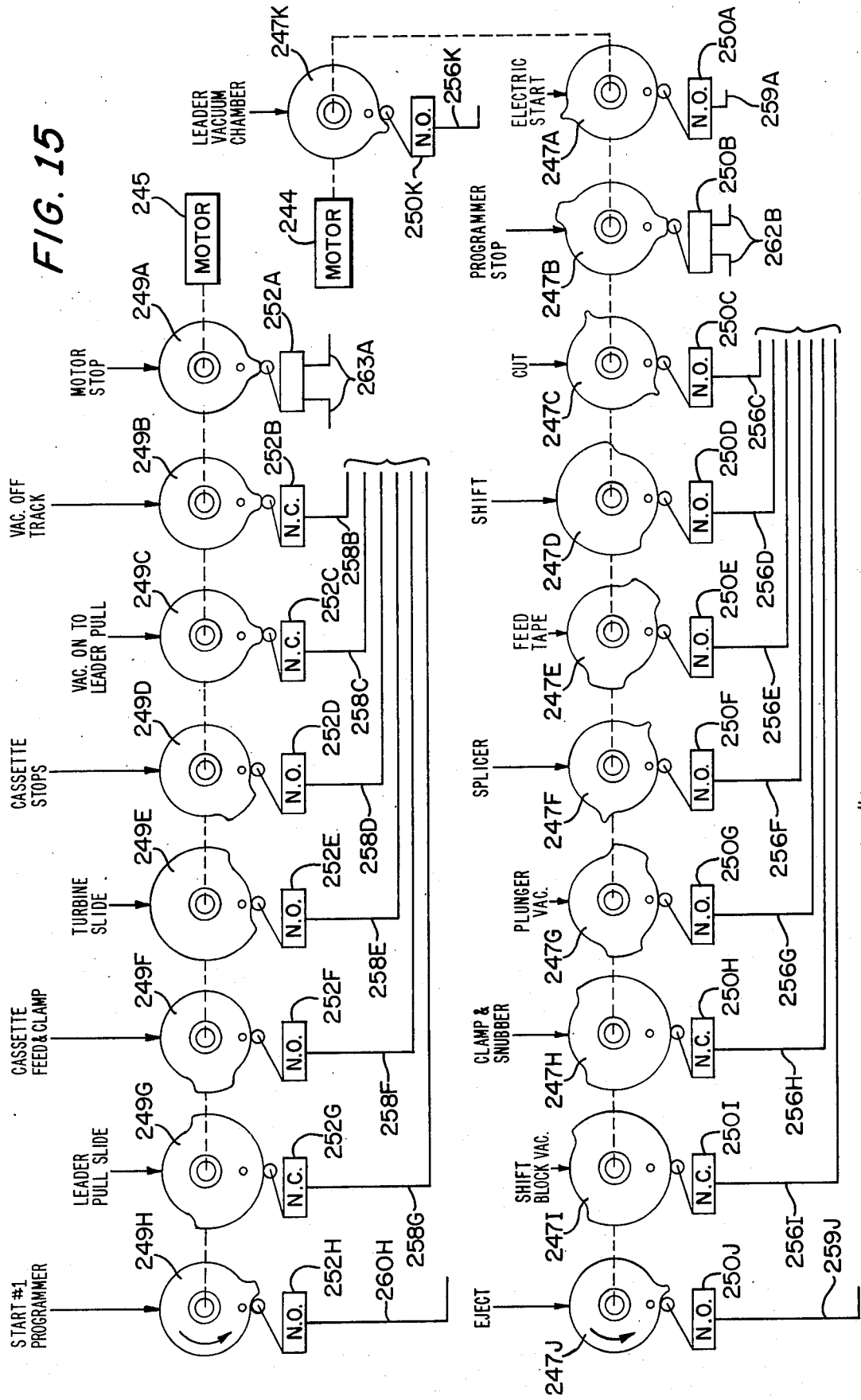
Figure 16:
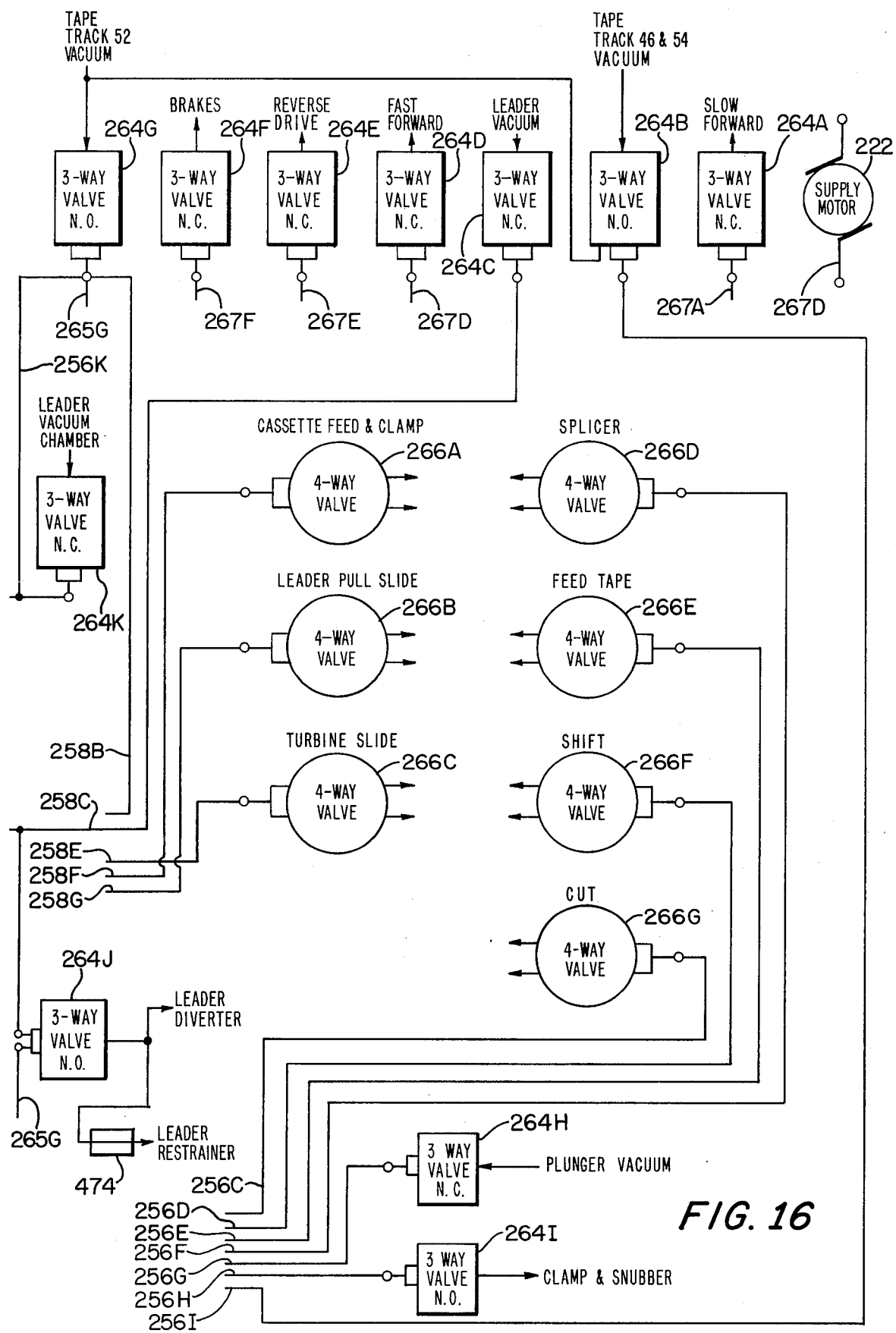

Turning now to FIGS. 15-17, the control system of the machine also includes two programmers, hereinafter referred to as Programmer #1 and Programmer #2, which respectivley comprise electric motors 244 and 245. Attached to the output shaft of motor 244 is a plurality of cams 247. Another plurality of cams 249 is attached to the output shaft of motor 245. Programmer #1 also carries a plurality of electric switches 250 that are operated by cams 247. Programmer #2 also carries a plurality of electric switches 252 that are operated by cams 249.

Programmer #1 has eleven cams 247A–K and Programmer #2 has eight cams 249A–H shaped as shown. FIG. 15 shows the positions of the cams of both programmers when the machine is in its START position. Additionally, FIG. 15 contains legend indicating the machine functions controlled by the various cams. Switches 250A and 250C–K and 252B–H are all single pole, single throw switches, of which switches 250A, C–G and K, and switches 252 D–F and E are normally open and the remainder are normally closed. Switches 250B and 252A are both single pole, double throw switches. Thus, when the machine is in its START position, switches 250H and I are held open by cams 247H and I respectively, and switches 252B, C and G are held open by cams 249B, C and G respectively. Also, switch 250B is held in a first state by one of the lobes of cam 247B and switch 252A is held in a first state by the lobe of cam 249A. At this point, it is to be noted that programmer #2 operates once and goes through a complete revolution each time the machine executes a complete cassette loading operation. Programmer #1 also undergoes a full revolution for each cassette loading operation, but is stops when its second lobe of cam 247B operates switch 250B, and then is turned on again by the control circuit hereinafter described after a predetermined amount of supply tape has been wound into the cassette. Programmer #1 stops again at the end of a complete revolution due to the first lobe of cam 247B reactivating switch 250B.

Switches 250A, B and J and switches 252A and H are connected to the electrical control circuit of FIG. 17, and switch 252D is connected to cassette counter 237, while the remaining switches are connected to selected ones of the solenoid valves shown in FIG. 16. To facilitate correlation, the connections between switches 250C–I and K and 252B, C and E–G and the solenoid valves are represented by lines 256C–I and K and 258B, C and E–G in FIGS. 15 and 16. Lines 259A and J and 260H represent connections of switches 250A and J and 252H to the control circuit of FIG. 17. Line 258D represents connection of switch 252D to counter 237. Switches 250B and 252A each have a pair of leads 262B and 263A respectively to indicate that they are double throw switches and are connected to the control circuit of FIG. 17.

Referring now to FIG. 16, the control system includes eleven three-way solenoid valves 264A–K and seven four-way solenoid valves 266A–G. FIG. 16 contains legend indicating the machine functions controlled by the various valves. Although not shown in detail, it is to be understood that each three-way valve has a first exhaust port, a second supply port that is connected to a source of pressurized air or to a source of vacuum such as a vacuum pump, a third outlet port that is connected to apply air or vacuum as the case may be to a machine element, and a valve member which is adapted to selectively couple the third port (a) with the first port when the machine element is to be relieved of air or vacuum and (b) with the second port when air or vacuum is to be applied to the machine element.

In FIG. 16, each three-way valve 264 that is designated "N.C." has its output port closed off from its supply port when its solenoid is deenergized. Similarly, the designation "N.O." indicates that the output port is open to the supply port when the three-way valve is deenergized. Similarly, although not shown in detail, each four-way valve 266 is to be understood as comprising a first exhaust port, a second supply port that is connected to a supply of pressurized air, third and fourth outlet ports (represented by the two arrows) that are connected to opposite ends of a double-acting fluid actuator, and a valve member that is adapted to selectively and reversibly couple one outlet port with the exhaust port and the other outlet port with the supply port, whereby air is selectively applied to one end of the actuator and simultaneously air pressure is relieved from the other end of the same actuator. Each outlet port is deemed open when connected to the supply port and closed when connected to the exhaust port.

The solenoids of valves 264B, C and G–I and valves 266A–G are energized when the cam switches to which they are connected are closed by the corresponding cams. The solenoids of valves 264C and 264J are both connected to switch 252C via line 258C. The solenoids of valves 264G and 264J are also adapted to be energized by a signal applied from the control circuit as represented by line 265G. The solenoids of valves 264A, D, E and F are adapted to be energized by signals applied from the control circuit as represented by lines 267A, D, E and F respectively.

The inlet ports of valves 264C, G, H and K are connected to a source of vacuum and the inlet port of valve 264B is connected to the outlet port of valve 264G. The outlet port of valve 264B is connected to guide tracks 46 and 54, while the outlet port of valve 264G is connected to tape guide track 52. The outlet port of valve 264C is connected to the leader extractor finger 108 via hose line 102, the outlet port of valve 264H is connected to apply vacuum to plunger 95 via hose fitting 93 and the outlet port of valve 264K is connected to apply vacuum to the vacuum chamber 448 via fitting 454.

The inlet ports of valves 264A, D, E, F, I and J are connected to a source of pressurized air. The outlet ports of valves 264A and D are connected to the "SLOW" and "FAST" input ports respectively of wind turbine 195. Valve 264A and D are arranged so that the former supplies air to turbine 195 at a slower rate than the latter, whereby the turbine can be made to run fast or slow according to which valve is opened. The outlet port of valve 264E is connected to the reverse drive input port of supply turbine 220 while the outlet port of valve 264F is connected to brake actuators 208 and 226 and counter wheel brake actuator 234. The outlet port of valve 264I is connected to brake snubber actuator 212 and also to a single-acting tape clamp actuator 460 (FIG. 11). The outlet port of valve 264J is connected to leader diverter actuator 402 and leader restrainer actuator 423. A variable flow restrictor 474 is connected between valve 264K and actuator 423 for the purpose of appropriately restricting the flow of air so that actuator 423 will operate slightly slower than actuator 402.

The inlet ports of four-way valves 266A–G are all connected to a suitable source of pressurized air. The two outlet ports of valve 266A are connected to the opposite ends of cassette feed actuator 162 and the normally closed outlet of the same valve is also connected to the air inlets of cassette brake actuators 165 and 166. The two outlet ports of valve 266B and 266C are connected to the opposite ends of extractor mechanism actuator 126 and turbine slide actuator 204 respectively. The two outlet ports of valves 266D and E are connected to the opposite ends of actuators 78 and 94 respectively of splicing tape dispenser-applicator 12. The two outlet ports of valves 266F and G are connected to the opposite ends of splicing block shift actuator 60 and knife actuator 66 respectively.

When the machine is in its START position, (1) vacuum is applied by valves 264B and G to guide tracks 46, 52 and 54; (2) no vacuum is applied by valves 264C and 264H to leader extractor finger 108 and plunger 95; (3) air is supplied by valve 264K to keep leader diverter actuator 410 and leader restrainer 432 in extended position; (4) no air is supplied by valves 264A, D and E to turbine 195 and 220 or by valve 264F to the three brake actuators; (5) air is applied by valve 264I to tape clamp actuator 460 and snubber actuator 212; (6) valve 266A supplies air to the cassette feed actuator 162 so as to keep its piston rod retracted and exhausts air from both of the cassette brake actuators 165 and 166; (7) valves 266B and C supply air to acutators 126 and 204 respectively so as to maintain the leader extractor carriage in the position shown in FIG. 1 and the drive turbine 195 in its extended position; (8) valves 266D and E supply air to actuators 78 and 94 so as to maintain carriage 70 and plunger 95 in their elevated positions (FIGS. 1-3); (9) valve 266F supplies air to actuator 60 so as to maintain splicing block 42 up against plate 6 as shown in FIGS. 2 and 3; and (10) valve 266G supplies air to actuator 66 so as to maintain the cutter blade in its retracted position.

Except as otherwise noted hereinafter, the circuit of FIG. 17 is the same as the one disclosed in U.S. Published Patent Application No. B 535,448 and, therefore, reference may be had to that publication for any circuit details which are not specifically disclosed by the following description of the mode of operation of the machine. For the purposes of this invention, the line 265G from relay 302 applies an energizing signal to valve 264K as well as valve 264G. Also normally open switch 270 connects power supply 274 with a relay 471 which has normally open contacts 472 connected between cam operated switch 252H and the input energizing terminal of relay 314.

Operation of the machine when it is under the control of tape counter 232 will now be described. For the purposes of this description, assume that the leading end of blank magnetic supply tape 22 is disposed in guide track 54 of the movable splicing block, and the machine is in its START position with wind turbine 195 in extended position, splicing block 42 retracted, vacuum applied to guide tracks 46, 52 and 54, and air supplied to clamp actuator 460 and snubber actuator 212, so that the tape in guide track 54 is held down by both the vacuum and the clamp actuator. Operation of the machine is commenced by closing START button switch 278. When this occurs, relay 308 is actuated to supply power to the motor of the #2 Programmer. Relay 308 is held on through the holding circuit established through the normally closed contact of switch 252A as Programmer #2 commences operating. Before relay 308 drops outs, switch 252A reverses its position and thereby continues to supply power to the motor of the #2 Programmer, whereby the programmer continues operating. Thereafter, cams 249B and C close switches 252B and C and thereby cause vacuum to be removed from tracks 46, 52 and 54 and applied to extractor finger 108, while at the same time air is removed from actuators 402 and 423 so as to cause leader diverter 410 and leader restraining 432 to retract. Immediately thereafter, switch 252E is closed so as to retract the wind turbine and then switch 252F closes to operate cassette feed actuator 162 and cassette brakes 165 and 166, whereby if a cassette is supported by clips 155 in loading position, it will be ejected and replaced by an empty cassette. Thereafter, wind turbine 195 remains retracted but the cassette feed actuator and brakes 165 and 166 are rapidly returned to their off positions and, as this occurs, cam 249G allows switch 252G to close, whereupon actuator 126 is caused to transport carriage 100 along the guide rails 98 and 99 far enough to locate the finger 108 immediately below the cassette which is supported by spring clips 155. As the finger 108 approaches the cassette supported on clips 155, the vacuum applied to the finger sucks the leader out of the supported cassette and into the chamber 110. Cam 249G reopens switch 252G as soon as finger 108 reaches the supported cassette, whereupon the carriage reverses its movement and returns to its original at-rest position. The leader that has been extracted from the cassette is held by finger 108 as the latter moves back over the aligned guide tracks 46 and 52 of splicing blocks 40 and 42. In this connection it is to be noted that in the usual empty cassette, the leader is wound partly on one hub and partly on the other hub and the amount wound on each hub may vary greatly. Therefore, the leader is not immovably clamped to the walls of cavity 110 of finger 108. Instead of the vacuum applied to finger 108 allows the leader tape to slip along the walls of cavity 110 (similar to movement of an endless belt) with the direction of leader slip depending upon which cassette hub holds the major amount of tape, whereby finger 108 can continue to extract leader from the cassette for the full extent of its return stroke even after the leader has been fully pulled off of the hub holding the least amount of tape.

As carriage 100 reaches its at-rest position switch 470 recloses and this causes contacts 472 of relay 471 to close. At the same time cam 249E reopens switch 252E so as to cause the wind turbine to move forward to engage its spindle with one of the hubs of the cassette supported by clips 155 and also cause pin 218 to enter between the two opposed portions of the withdrawn leader loop and maintain them apart from one another near the cassette. Thereafter, cams 249D and H momentarily close switches 252D and H. When this occurs, cassette counter 237 indexes one count and time delay relay 314 is actuated through the normally closed contact of switch 250D and the now closed contacts of switch 252H and the now closed contacts 472 of relay 471, thereby energizing the motor of the #1 Programmer. Immediately thereafter, cams 249B and 249C reopen switches 252B and C. Opening of switch 252B causes vacuum to be reapplied to guide tracks 46, 52 and 54. Opening of switch 252C causes (1) vacuum to be removed from extractor finger 108 and air to be reapplied to actuators 402 and 423 via valve 264J so as to cause members 410 and 432 to be extended as in FIGS. 11 and 12. Simultaneously cam 249A causes switch 252A to reverse and stop the #2 Programmer. Switch 470 assures that Programmer #1 will not start until extractor carriage is in its at-rest position.

Relay 314 remains on long enough after switch 252H is reopened to permit can 247B to cause switch 250B to reverse states and thereby maintain relay 314 in actuated condition so that the motor of the #1 Programmer will continue to operate. As soon as Programmer #1 begins to operate, cam 247K momentarily closes switch 250K and this causes valve 264G to close and release the vacuum from the tape tracks 46 and 52 and also causes valve 264K to open and apply a vacuum to chamber 448 whereby the leader is pulled out of finger 108 and into chamber 448. When this occurs, the leader will be intercepted by extension 436 of leader restrainer 432. The latter acts to hold the leader as it is drawn into chamber 448. Cam 247K holds switch 250K closed only long enough to allow the leader to be sucked into chamber 448 and engage extension 436, after which the switch reopens to reapply the vacuum to tracks 46 and 54 and release the vacuum from chamber 448. Immediately thereafter cam 247C closes switch 250C to briefly energize the solenoid of valve 266G, whereby the cutter severs the leader which is disposed along the guide tracks 46 and 52. Thereafter, cam 247D closes switch 250D to energize the solenoid of valve 266F. When this occurs, the movable splicing block 42 is moved outwardly so as to place the supply tape in track 54 in alignment with the leader section disposed in guide track 46. Then cam 247G closes switch 250G so that vacuum is applied to plunger 95. Next cam 247E closes switch 250E to cause the splicing tape dispenser-applicator carriage 70 to be moved down to the two splicing blocks. Then cam 247F closes switch 250F, whereupon plunger 95 is driven downward to apply a section of splicing tape to the abutting ends of the supply tape in track 54 and the leader section in track 46. Cam 247G reopens switch 250G to remove the vacuum from the plunger as the latter reaches the end of its downward stroke. Switch 250F is closed only momentarily, so that plunger 95 is quickly restored to its normal raised position. Cam 247E reopens switch 250E after plunger 94 is raised, whereupon carriage 70 is moved back up away from the splicing blocks. Thereafter, cams 247H and I allow switches 250H and I to close, whereupon valve 264I closes to release tape clamp actuator 270 and snubber actuator 212 and valve 264B closes to terminate vacuum to tracks 46 and 54. Then cam 247A momentarily closes switches 250A to trigger signal generator 280 and immediately thereafter cam 247B operates through its second lobe (the upper one shown in FIG. 15) to cause switch 250B to change states and revert back to the position shown in FIG. 17, whereupon Programmer #1 immediately stops with the second lobe of cam 247B still engaging switch 250B.

When signal generator 280 is triggered by the momentary closing of switch 250A, it produces an output pulse of sufficient duration to energize and latch relay 282, whereupon the latter provides power to energize motor 222 and cause valve 264D to open and thereby operate wind turbine 195 in its high speed mode.

The output pulse from signal generator 280 also automatically resets tape counter 232. Latching relay 282 is maintained in a latched condition until it is reset by an output pulse from counter 232, which pulse is generated when a predetermined amount of supply tape has been wound into the cassette. Unlatching, i.e., resetting, of relay 282 results in shutting off motor 222 and closing off the supply of pressurized air to wind turbine 195.

The output pulse from tape counter 232 also triggers signal generator 286, whereupon the latter produces an output pulse of sufficient duration to cause brake relay 287 to momentarily energize brake valve 264F, whereupon the two turbine brake actuators and the counting wheel brake actuator are all operated to stop rotation of the supply tape shaft 16, wind spindle 129 and counter wheel 26. The output signal from generator 286 also triggers signal generators 288, causing the latter to produce an output pulse which energizes reverse relay 293 immediately after the three brake actuators are released. When this occurs, reverse drive air valve 264E is opened to supply air to the reverse drive inlet port of the feed turbine. Reverse relay 293 stays on for the duration of the signal pulse generator 288, and thereafter it automatically rests itself so as to cause valve 264E to terminate the flow of air to the supply reel turbine. The output signal from generator 288 has a pulse width such that relay 293 will be on just long enough for the feed turbine to remove any slack in the supply tape between reel 20 and the cassette in loading position and assure that the supply tape is properly aligned with guide tracks 46 and 54 of the splicing blocks. The output from signal generator 288 also triggers signal generator 295 whereupon the latter produces an output pulse immediately after relay 293 has been reset. The output pulse of generator 295 is applied to brake relay 287 and is of sufficient duration to cause relay 287 to momentarily reapply the brakes to the supply and wind turbine shafts and also the counter wheel shaft as previously described.

The output pulse of signal generator 295 also momentarily actuates relay 296 so as to momentarily close its contacts 297. When this occurs, relay 314 is energized through the normally closed contact of switch 250B, thereby restarting the motor of the #1 Programmer. Relay 314 stays on long enough after relay 296 has reset itself to allow cam 247B to shift switch 250B so as to provide a holding circuit for maintaining relay 314 in the energized condition, whereby the #1 Programmer continues to operate.

Figure 14:
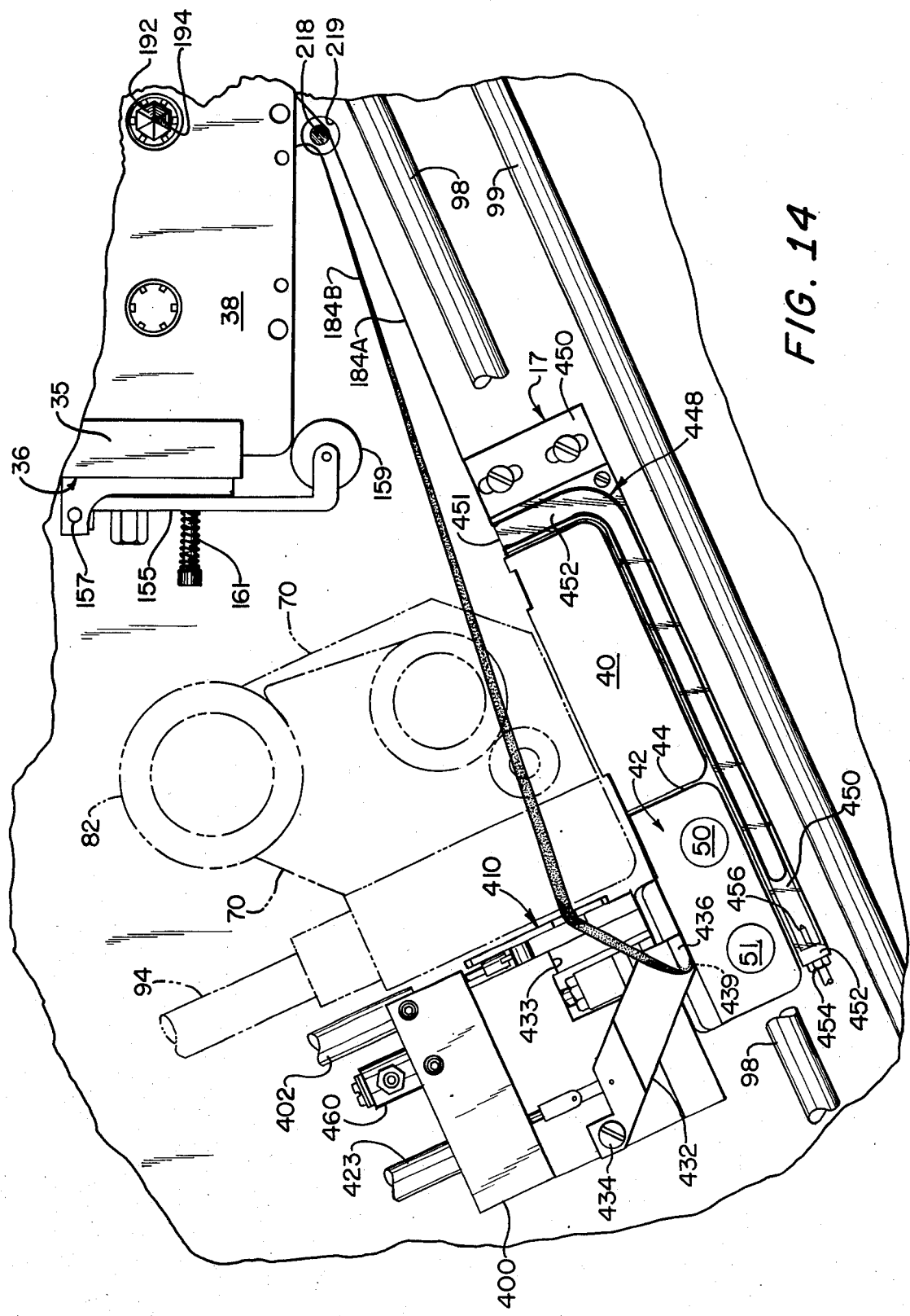
FIG. 14 is an enlarged view in front elevation of a portion of the same machine showing how a leader is disposed after it has been extracted and before it has been slit into two sections.

When the #1 Programmer restarts, the first thing that occurs is that cam 247I reopens switch 250I so that vacuum is restored to guide tracks 45 and 54 and cam 247H reopens switch 250H to reactuate snubber actuator 212 and tape clamp actuator 270. Then cam 247C closes switch 250C to operate the cutter, whereupon the supply tape extending along the tracks 54 and 46 is severed. Immediately after switch 250C reopens, cam 247D recloses switch 250D, whereupon valve 266F applies air to shift actuator 60 so as to cause the movable splicing block 42 to move inwardly again toward the plate 6 and thereby align its guide track 52 with guide track 46. As soon as the shifting block movement has been completed, cams 247G, E and F reclose and reopen switches 250G, 250E and 247F in the same sequence as previously described so as to cause the splicing tape dispenser-applicator unit 12 to apply splicing tape to the abutting ends of the supply tape and leader section disposed in guide tracks 46 and 52 respectively. Thereafter, cam 247J closes switch 250J with the result that signal generator 298 is triggered. Immediately thereafter, cam 247B shifts switch 250B back to its original state as shown in FIG. 14 to deactivate relay 314, whereupon the motor of #1 Programmer is shut off.

When signal generator 298 is triggered by the closing of switch 250J, relays 300 and 302 are energized for a short period of time determined by the pulse width of the signal produced by generator 298. When relay 300 is energized, it energizes the solenoids of turbine valve 264A, whereupon the wind turbine is caused to move forward in its slow speed mode. Simultaneously, relay 302 causes valve 264J to release air from actuators 402 and 423 and this causes leader diverter 410 and leader restrainer 432 to retract. Relay 302 also causes eject vacuum valve 264G to shut off vacuum to the three tape guide tracks 46, 52 and 54 so that the supply tape and leader sections on guide tracks 46 and 52 are free to be wound into the cassette by the wind turbine. When valve 264J releases air from actuators 402 and 423, diverter member 410 retracts before restrainer member 432. Thus as the latter snaps back up (counterclockwise as seen in FIG. 11), the upper part 184B of the leader engages the straight edge portion 475 of member 410 and is cammed thereby laterally off of extension 436 of restrainer member 432. To facilitate this dismounting of the leader the upper surface of extension 436 is rounded off near the extension's free end, as shown at 477. Relays 300 and 302 are reset automatically when the output signal from generator 298 terminates, whereby the turbine stops and vacuum is restored to the three guide tracks. The output of generator 298 triggers signal generator 304 which in turn produces an output pulse which actuates programmer start relay 305 before relays 300 and 302 are reset. When relay 300 is actuated, its contacts 306 close to reactivate relay 308 and thereby restart the motor of the #2 Programmer. Relay 308 is kept on after contacts 306 reopen due to its holding circuit being completed through the normally closed contacts of switch 250A.

The #2 Programmer then operates through its complete cycle as previously described to cause the loaded cassette to be ejected amd replaced by a new cassette and the leader of the new cassette to be extracted and positioned on guide tracks 46 and 52. As Programmer #2 reaches the end of its cycle, cam 249H recloses switch 252H to restart the #1 Programmer so that the new cassette will be loaded as just described. Thereafter the machine will continue to load successive cassettes automatically until the machine is shut off by operation of STOP switch 279 or release of relay 310 due to exhaustion of supply tape or an output signal from cassette counter 237 when a predetermined number of cassettes have been loaded. If desired, a normally closed switch may be mounted to the magazine and connected in series with STOP switch 239 so as to shut off the machine when the supply of blank cassettes has been exhausted.

If the supply tape to be loaded contains a number of prerecorded albums, switches 285, 289 and 292 are switched to render the control system responsive to "Cue" tones on the supply tape. In such case, when the "Cue" tone is sensed during the fast wind operation, flip-flop 284 will respond to the "Cue" tone signal and cause relay 282 to be unlatched to stop feed motor 222 and wind turbine 195. However, due to the high speed operation of wind turbine 195, the sensed "Cue" tone section of the supply tape will have been wound into the cassette before the brake actuators have stopped the wind turbine 195 and feed motor 222. However, switch 289 allows the output of signal generator 288 to actuate latching reverse relay 290 so that air will be supplied to the reverse drive inlet of supply turbine 220 until relay 290 is unlatched. The latter event occurs when enough tape has been backed out of the cassette for the previously sensed "Cue" tone to be sensed agains by read head 276, at which point flip-flop 284 reverses states, whereby the signal appearing on its $\overline{Q}$ output line will unlatch relay 290 and thereby terminate the reverse wind operation. Turbine 220 operates at a relatively slow speed in the reverse direction so that relay 290 will unlatch and thereby stop the reverse wind operation while the sensed "Cue" tone section is over the splicing block assembly, with the result that on subsequent operation of programmer #1, the cutter will sever the supply tape at the sensed "Cue" tone section. Except for responding to the "Cue" tone signal, the control system otherwise will operate in the same manner as when it is set to respond to the output of tape counter 232.

As is believed apparent from the foregoing description, operation of the extractor mechanism causes finger 108 to withdraw the leader from the cassette in loading position to substantially the full extent permitted by free wheeling of the cassette hubs and locates the bottom part 184A of the leader loop in tracks 46 and 52. After carriage 100 is back in its at-rest position and before the vacuum has been removed from finger 108 and applied to vacuum chamber 448, the bottom part 184A of the leader will extend substantially straight from pin 218 to finger 108, with the result that the midpoint of the leader will be to the left of gap 44 (as seen in FIG. 14), i.e., measured from gap 44 back to the cassette the upper section 184B of the leader loop will be substantially longer than the bottom section 184A. Hence cutting the leader at gap 44 would produce two leader sections of different length. However, by releasing the leader from finger 108 and intercepting it with leader restrainer 432 as it is sucked into vacuum chamber 448, the midpoint of the leader is shifted so that it is substantially at gap 44, thus assuring that operation of the knife will sever the leader into two leader sections of substantially equal length. By mounting block 400 so that it is shiftable lengthwise relative to splicing block 42, it is possible to alter the degree to which the midpoint of the leader is shifted by the conjoint action of restrainer member 432 and vacuum chamber 448. Preferably also vacuum chamber 448 is made long enough to complete the withdrawal of the leader from the cassette in the event it is not extracted for its full length by finger 108, as may occur if the leader length exceeds specifications.

Obviously the apparatus may be modified in various ways without departing from the principles of the invention. Thus, for example, the two electro-mechanical programmers may be replaced by a digital electronic control system. Still other changes will be obvious to persons skilled in the art.

What is claimed is:

1. In combination with a machine for loading a selected supply tape into a cassette which includes a tape leader, said machine having cassette holding means for holding the cassette to be loaded, a splicing block assembly for supporting the leading end of the supply tape and the leader of the cassette to be loaded, leader extractor means movable between said cassette holding means and said splicing block assembly for withdrawing the leader from a cassette held by said cassette holding means and positioning the withdrawn leader on said splicing block assembly, means for operating said leader extractor means, multi-elememt means for sequentially (a) severing a leader that has been positioned on the splicing block assembly into first and second leader sections, (b) splicing said first leader section to the leading end of the supply tape, (c) winding the first leader section and a predetermined length of the supply tape which is connected thereto into the cassette held by the cassette holding means, (d) severing said supply tape at said splicing block assembly so as to form a trailing end for said predetermined length of supply tape, and (e) splicing said trailing end to the second leader section, and means for causing said multi-element means to operate according to sequence (a) through (e) after a leader has been positioned on said splicing block assembly by said leader extractor means, the improvement comprising: leader centering means for acting upon a leader which has been extracted so as to cause the leader to shift lengthwise relative to the splicing block assembly to the extent required for the severing of the leader to be effected substantially at the midpoint of the leader, and means for operating said leader centering means before operation of said multi-element means.

2. In combination with a machine for loading a selected supply tape into a cassette which includes two spools and a tape leader attached at its opposite ends to the two spools, said machine having cassette holding means for holding the cassette to be loaded, a splicing block assembly for supporting the leading end of the supply tape and the leader of the cassette to be loaded, leader extractor means movable relative to said splicing block assembly for withdrawing a leader from a cassette held by said cassette holding means and positioning said same leader on said splicing block assembly, cutting means for severing a supply tape or a leader tape that is supported by said splicing block assembly and extends across a predetermined cutting line, splicing means for splicing an end of the supply tape to an abutting end of a leader tape, drive means for rotating a selected spool of a cassette held by said cassette holding means so that a length of tape connected to a leader attached to said spool may be wound thereon, and means for operating said foregoing means in a predetermined sequence whereby automatically (a) a leader is withdrawn from a cassette held by said cassette holding means and positioned on said splicing block assembly, (b) the cassette leader tape on the splicing block assembly is severed into first and second leader sections, (c) the first leader section is spliced to the leading end of a supply tape supported by said splicing block assembly, (d) the first leader section and a predetermined length of the supply tape which is connected thereto are wound into the cassette held by said cassette holding means, (e) the supply tape is severed at the splicing block assembly so as to form a trailing-end for said predetermined length of supply tape, (f) splicing said trailing-end to the second leader section, (g) removing the second leader section from said splicing block assembly, and (h) removing the cassette from the cassette holding means so that another cassette to be loaded may be received by said cassette holding means, the improvement comprising means for positioning the withdrawn leader so that its midpoint is substantially at said cutting line, whereby that the severing of said leader into said first and second leader sections occurs substantially equidistant from the ends thereof.

3. Apparatus according to claim 2 wherein said last mentioned means comprises means for releasing the withdrawn leader from the leader extractor means and means for releasably restraining said leader in position on said splicing block assembly.

4. Apparatus according to claim 3 further including a vacuum chamber for receiving a portion of the withdrawn leader, and means for applying a vacuum to said chamber so as to cause a portion of said leader to be sucked into said chamber after said leader is released by said extractor means.

5. Apparatus according to claim 4 wherein said leader extractor comprising a finger portion having a cavity for receiving a leader, means for connecting said cavity to a vacuum source so as to create a suction force to act upon a leader in a manner such as to cause it to be sucked into the cavity, and selectively operable means for disconnecting said cavity from said vacuum source in timed relation to application of a vacuum to said chamber so as to release a leader from said cavity and cause it to be sucked into said chamber.

6. Apparatus according to claim 4 wherein said cassette holding means is spaced from said splicing block assembly and said leader extractor means is mounted for movement to and from said cassette holding means.

7. Apparatus according to claim 4 wherein said vacuum chamber is located adjacent to said splicing block assembly.

8. Apparatus according to claim 7 wherein said vacuum chamber has an opening located between said splicing block assembly and said cassette holding means.

9. Apparatus according to claim 8 wherein said vacuum chamber is fixed relative to said splicing block assembly.

10. Apparatus according to claim 1 wherein said cassette holding means is adapted to hold a cassette in a selected loading station and to release said cassette after it has been loaded with tape, and further including storage means for storing a plurality of cassettes to be loaded and for advancing cassettes one at a time from said storage means to said cassette holding means.

11. Apparatus according to claim 10 wherein said cassette holding means holds a cassette in a selected plane, and said storage means comprises a magazine for containing a plurality of cassettes to be loaded, said magazine having a discharge opening at its bottom end and being arranged so that the bottommost cassette therein is disposed substantially in said selected plane.

12. Apparatus according to claim 11 wherein said loading position is located below said discharge opening.

13. Apparatus according to claim 12 wherein said splicing block assembly is located below and to one side of said magazine, and said leader extractor means is mounted for movement between a first position in which it is located to one side of said splicing block assembly and a second position in which it is located adjacent to a cassette that is held at said loading station.

14. Apparatus according to claim 13 wherein said leader extractor means comprises a finger portion having a cavity for receiving a leader, means for coupling said cavity to a vacuum source to create a suction force to act upon a leader in a manner such as to cause the leader to be sucked into said cavity and to form a loop conforming in shape to the internal configuration of said cavity, and means supporting said leader extractor means for movement to and from said loading station.

15. Apparatus according to claim 14 wherein said means supporting said leader extractor means comprises at least one rail on which said leader extractor means is slidable.

16. Apparatus according to claim 14 further including means for reciprocating said leader extractor means on said at least one rail.

17. Apparatus according to claim 14 including means for selectively terminating said suction force.

18. Apparatus according to claim 14 wherein said finger portion is located in the same plane as a cassette located at said loading position.

19. Apparatus according to claim 10 wherein said storage means for storing a plurality of cassettes to be loaded and for advancing them one at a time to said loading station comprises a magazine for holding a plurality of cassettes to be loaded and cassette guide means for receiving cassettes one at a time from said magazine and guiding them to said cassette holding means.

20. Apparatus according to claim 19 further including means for selectively stopping cassettes from moving from said magazine to said guide means.

21. Apparatus according to claim 20 wherein said guide means are located above said cassette holding means.

22. Apparatus according to claim 21 further including means for advancing cassettes between said pair of guides to said cassette holding means.

23. Apparatus according to claim 10 wherein said leader extractor means is adapted to move back and forth over said splicing block means.

24. Apparatus according to claim 23 including means for controlling movement of said leader extractor means in timed relation to advancement of a cassette to said loading position.

25. Apparatus according to claim 1 wherein said splicing block means comprises a stationary block and a movable block, said stationary block having a first guide track for receiving a first portion of said leader, and said movable block having a second guide track for receiving the tape to be loaded and a third guide track for receiving a second portion of said leader, and means for moving said movable block to alternately shift one or the other of said second and third guide tracks into alignment with said first track.

26. Apparatus according to claim 25 including means for selectively applying vacuum to said first, second and third guide tracks.

27. Apparatus according to claim 26 wherein said leader extractor means is disposed so as to position the extracted leader along said first and second guide tracks when said first and second guide tracks are aligned with one another.

28. Apparatus according to claim 1 wherein the leader is withdrawn by said leader extractor means as a loop having an upper portion and a lower portion with the lower portion being positioned on the splicing block assembly, and further including means carried by said splicing block assembly for diverting the upper portion of said loop laterally away from said splicing block assembly so as not to interfere with operation of said splicing means.

29. A machine for loading a selected supply tape into a cassette which includes two spools and a leader tape attached at its ends to the two spools, said machine comprising cassette holding means for releasably holding a cassette to be loaded in a predetermined loading position, means for feeding a cassette to be loaded to said cassette holding means, a splicing block assembly for supporting the leading end of a supply tape and the leader of a cassette held at said loading position, cutting means for cutting along a predetermined cutting line a supply tape or a leader tape that is supported by said splicing block assembly and extends across said predetermined cutting line, leader extractor means mounted for reciprocal movement relative to said splicing block assembly for extracting a leader from a cassette held by said cassette holding means and positioning the withdrawn leader on said splicing block assembly, means for operating said leader extractor means and for causing said leader extractor means to release said leader after it has been positioned on said splicing block assembly, leader repositioning means for acting upon the leader released by said leader extractor means so as to (a) hold said leader on said splicing block assembly and (b) cause said leader to shift lengthwise relative to the splicing block assembly to the extent required to align the midpoint of the leader tape substantially at said cutting line, splicing means for splicing together abutting ends of the leader and supply tapes, drive means for rotating one of the spools of a cassette held at said loading station so as to wind tape onto said spool, and means for operating said foregoing means so that automatically (a) a cassette is fed to said cassette holding means and held in said loading position, (b) the leader is withdrawn from said cassette and positioned on said splicing block assembly, (c) the leader is repositioned on said splicing block assembly, (d) said leader is severed into two sections of substantially equal length, (e) one leader section is spliced to the leading end of the supply tape, (f) a length of supply tape and the one leader section are wound into the cassette onto the spool to which the one leader section is connected, (g) the supply tape is severed so as to form a trailing end for said length of supply tape on said splicing block assembly, (h) the other leader section is spliced to the trailing end of the severed length of supply tape, (i) the other leader section is wound into the cassette, and (j) the cassette containing the length of supply tape is discharged from the loading position and replaced by a new cassette.

30. Method for automatically loading a selected supply tape into cassettes of the type which includes two spools and a leader tape attached at its ends to the two spools, said method comprising the following steps:

advancing a first cassette to be loaded from a magazine to a selected loading position, withdrawing the leader from said first cassette by a suction device and moving the suction device with the leader so as to position the withdrawn leader upon a splicing block assembly which is displaced from said loading position, releasing the leader from the suction device and repositioning the leader on the splicing block assembly so that the midpoint of the leader is substantially aligned with a predetermined cutting line, severing the leader along said cutting line into first and second leader sections each supported by said splicing block assembly, attaching said first leader section to the leading end of a supply tape of indefinite length, winding said first leader section and the supply tape attached thereto into said first cassette, terminating winding, severing said supply tape at a selected point so as to form a trailing end for the supply tape wound into said first cassette, splicing said trailing end to the second leader section, winding said trailing end and said second leader section into said first cassette, discharging said first cassette from said loading position and replacing it with a second cassette, and automatically repeating the foregoing steps in order to effect loading of said second cassette.

31. A method according to claim 30 wherein repositioning of the leader involves sucking a portion of the leader into a vacuum chamber.

32. An apparatus for loading a cassette having at least one rotatable spool and a leader attached to the spool with a predetermined length of magnetic tape, characterized by means for releasably holding a cassette to be loaded in a selected loading position, leader and tape splicing means including a splicing block assembly spaced from said selected loading position for supporting a portion of the tape to be loaded and the leader of a cassette located at said selected loading position, leader extractor means movable relative to said splicing block assembly and said cassette holding means for withdrawing the leader from a cassette located at said selected loading position and positioning said leader on said splicing block assembly, a permanent vacuum chamber having an entrance disposed between said splicing block assembly and said selected loading position, and means for connecting said chamber with a vacuum source so as to create a suction force to draw a portion of the extracted leader into said vacuum chamber.

33. Apparatus according to claim 32 wherein the entrance of said vacuum chamber is positioned immediately adjacent to said splicing block assembly and said leader extractor means is arranged to dispose a portion of the withdrawn leader over and close to the entrance to said vacuum chamber.

* * * * *